(12) United States Patent
Nakakura et al.

(10) Patent No.: US 10,451,129 B2
(45) Date of Patent: Oct. 22, 2019

(54) BICYCLE DISC BRAKE ROTOR

(71) Applicant: SHIMANO INC., Sakai (JP)

(72) Inventors: Masahiro Nakakura, Sakai (JP); Yusuke Hosomi, Sakai (JP); Noriko Masuta, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/997,582

(22) Filed: Jan. 18, 2016

(65) Prior Publication Data

US 2017/0204921 A1    Jul. 20, 2017

(51) Int. Cl.
   *F16D 65/12*    (2006.01)
   *F16D 65/02*    (2006.01)

(52) U.S. Cl.
   CPC ......... *F16D 65/128* (2013.01); *F16D 65/123* (2013.01); *F16D 2065/132* (2013.01); *F16D 2065/1316* (2013.01); *F16D 2065/1324* (2013.01)

(58) Field of Classification Search
   CPC ...... F16D 65/12; F16D 65/123; F16D 65/128; F16D 2065/132; F16D 2065/1332; F16D 65/78; F16D 65/807; F16D 65/84; F16D 65/847
   See application file for complete search history.

(56) References Cited

U.S. PATENT DOCUMENTS

| | | | | |
|---|---|---|---|---|
| 4,049,090 | A * | 9/1977 | Buell | F16D 65/125 188/251 M |
| 2011/0240420 | A1* | 10/2011 | Souwa | F16D 65/12 188/218 XL |
| 2012/0000736 | A1* | 1/2012 | Koshiyama | F16D 65/847 188/71.6 |
| 2012/0222926 | A1* | 9/2012 | Iwai | F16D 65/123 188/218 XL |
| 2013/0168193 | A1* | 7/2013 | Iwai | F16D 65/12 188/218 XL |
| 2015/0034430 | A1* | 2/2015 | Nakakura | F16D 65/12 188/218 XL |
| 2015/0034431 | A1* | 2/2015 | Wen | F16D 65/847 188/218 XL |
| 2015/0144441 | A1* | 5/2015 | Kuo | F16D 65/847 188/218 XL |
| 2015/0345579 | A1* | 12/2015 | Iwai | F01D 65/12 188/26 |

FOREIGN PATENT DOCUMENTS

| | | |
|---|---|---|
| CN | 101290033 B | 12/2010 |
| TW | M470900 U | 1/2014 |
| TW | M492981 U | 1/2015 |

* cited by examiner

*Primary Examiner* — Nicholas J Lane

(74) *Attorney, Agent, or Firm* — Mori & Ward, LLP

(57) ABSTRACT

A bicycle disc brake rotor comprises a friction member, a cooling member, and a hub attachment member. The friction member includes at least one friction surface. The cooling member is coupled to the friction member. The cooling member includes at least one cooling surface. A surface area of the at least one cooling surface is equal to or larger than 110% of a surface area of the at least one friction surface. The hub attachment member is coupled to the friction member. The hub attachment member includes a hub engagement structure to engage with a bicycle hub assembly.

23 Claims, 28 Drawing Sheets

(COMPARATIVE EXAMPLE)

(COMPARATIVE EXAMPLE)

BICYCLE DISC BRAKE ROTOR

BACKGROUND OF THE INVENTION

Field of the Invention

The present invention relates to a bicycle disc brake rotor.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle brake.

SUMMARY OF THE INVENTION

In accordance with a first aspect of the present invention, a bicycle disc brake rotor comprises a friction member, a cooling member, and a hub attachment member. The friction member includes at least one friction surface. The cooling member is coupled to the friction member. The cooling member includes at least one cooling surface. A surface area of the at least one cooling surface is equal to or larger than 110% of a surface area of the at least one friction surface. The hub attachment member is coupled to the friction member. The hub attachment member includes a hub engagement structure to engage with a bicycle hub assembly.

With the bicycle disc brake rotor according to the first aspect, it is possible to improve cooling efficiency of the bicycle disc brake rotor.

In accordance with a second aspect of the present invention, the bicycle disc brake rotor according to the first aspect is configured so that the surface area of the at least one cooling surface is equal to or smaller than 200% of the surface area of the at least one friction surface.

With the bicycle disc brake rotor according to the second aspect, it is possible to further improve cooling efficiency of the bicycle disc brake rotor.

In accordance with a third aspect of the present invention, the bicycle disc brake rotor according to the first or second aspect is configured so that the at least one cooling surface is disposed not to overlap with the at least one friction surface when viewed from an axial direction parallel to a rotational center axis of the bicycle disc brake rotor.

With the bicycle disc brake rotor according to the third aspect, it is possible to utilize a surrounding space of the at least one friction surface for the at least one cooling surface without interference between the at least one friction surface and the at least one cooling surface.

In accordance with a fourth aspect of the present invention, the bicycle disc brake rotor according to any one of the first to third aspects is configured so that the at least one cooling surface is provided radially inward of the at least one friction surface with respect to a rotational center axis of the bicycle disc brake rotor.

With the bicycle disc brake rotor according to the fourth aspect, it is possible to utilize a radially inner space of the at least one friction surface for the at least one cooling surface.

In accordance with a fifth aspect of the present invention, the bicycle disc brake rotor according to any one of the first to fourth aspects is configured so that the friction member includes a first inner peripheral edge. The cooling member includes a second inner peripheral edge provided radially inward of the first inner peripheral edge with respect to the rotational center axis.

With the bicycle disc brake rotor according to the fifth aspect, it is possible to increase the surface area of the at least one cooling surface.

In accordance with a sixth aspect of the present invention, the bicycle disc brake rotor according to the fifth aspect is configured so that the friction member includes an outer peripheral edge. A maximum distance which is radially defined between the first inner peripheral edge and the second inner peripheral edge is longer than a maximum distance which is radially defined between the first inner peripheral edge and the outer peripheral edge.

With the bicycle disc brake rotor according to the sixth aspect, it is possible to further increase the surface area of the at least one cooling surface.

In accordance with a seventh aspect of the present invention, the bicycle disc brake rotor according to the fifth or sixth aspect is configured so that the cooling member includes a center opening defined by the second inner peripheral edge.

With the bicycle disc brake rotor according to the seventh aspect, it is possible to increase the surface area of the at least one cooling surface with avoiding interference between the cooling member and a bicycle hub assembly.

In accordance with an eighth aspect of the present invention, the bicycle disc brake rotor according to the seventh aspect is configured so that the cooling member includes at least one opening provided radially outward of the center opening.

With the bicycle disc brake rotor according to the eighth aspect, it is possible to save weight of the bicycle disc brake rotor with improving cooling efficiency of the bicycle disc brake rotor.

In accordance with a ninth aspect of the present invention, the bicycle disc brake rotor according to any one of the first to eighth aspects is configured so that the friction member is made of a first material. The cooling member is made of a second material different from the first material.

With the bicycle disc brake rotor according to the ninth aspect, it is possible to select the second material for improving cooling efficiency of the bicycle disc brake rotor regardless of the first material of the friction member.

In accordance with a tenth aspect of the present invention, the bicycle disc brake rotor according to the ninth aspect is configured so that the first material has a first thermal conductivity. The second material has a second thermal conductivity. The second thermal conductivity is larger than the first thermal conductivity.

With the bicycle disc brake rotor according to the tenth aspect, it is possible to improve cooling efficiency of the bicycle disc brake rotor using the second material having the second thermal conductivity.

In accordance with an eleventh aspect of the present invention, the bicycle disc brake rotor according to the ninth or tenth aspect is configured so that the first material includes stainless steel. The second material includes aluminum.

With the bicycle disc brake rotor according to the eleventh aspect, it is possible to improve cooling efficiency of the bicycle disc brake rotor with maintaining wear resistance of the friction member.

In accordance with a twelfth aspect of the present invention, the bicycle disc brake rotor according to any one of the first to eleventh aspects is configured so that the friction member includes a first friction surface provided as the at least one friction surface and a second friction surface provided as the at least one friction surface. The second friction surface is opposite to the first friction surface in an axial direction parallel to a rotational center axis of the bicycle disc brake rotor. The surface area of the at least one cooling surface is equal to or larger than 110% of a total surface area of the first and second friction surfaces.

With the bicycle disc brake rotor according to the twelfth aspect, it is possible to easily increase the surface area of the at least one cooling surface.

In accordance with a thirteenth aspect of the present invention, the bicycle disc brake rotor according to the twelfth aspect is configured so that the cooling member includes a first cooling surface provided as the at least one cooling surface and a second cooling surface provided as the at least one cooling surface. The second cooling surface is opposite to the first cooling surface in the axial direction. A total surface area of the first and second cooling surfaces is equal to or larger than 110% of the total surface area of the first and second friction surfaces.

With the bicycle disc brake rotor according to the thirteenth aspect, it is possible to easily increase the surface area of the at least one cooling surface using the first cooling surface and the second cooling surface.

In accordance with a fourteenth aspect of the present invention, the bicycle disc brake rotor according to any one of the first to thirteenth aspects is configured so that the friction member includes a first friction part and a second friction part. The cooling member includes a cooling body and a radially outer part. The cooling body includes the at least one cooling surface. The radially outer part is provided radially outward of the cooling body and is provided between the first friction part and the second friction part in an axial direction parallel to a rotational center axis of the bicycle disc brake rotor.

With the bicycle disc brake rotor according to the fourteenth aspect, it is possible to assure strength of the bicycle disc brake rotor with improving cooling efficiency of the bicycle disc brake rotor.

In accordance with a fifteenth aspect of the present invention, the bicycle disc brake rotor according to the fourteenth aspect is configured so that the first friction part is attached to the radially outer part of the cooling member. The second friction part is attached to the radially outer part of the cooling member.

With the bicycle disc brake rotor according to the fifteenth aspect, it is possible to improve strength of the bicycle disc brake rotor.

In accordance with a sixteenth aspect of the present invention, the bicycle disc brake rotor according to any one of the first to fifteenth aspects is configured so that the hub attachment member overlaps with the friction member to define a first overlapping region when viewed from an axial direction parallel to a rotational center axis of the bicycle disc brake rotor. The hub attachment member overlaps with the at least one cooling surface to define a second overlapping region when viewed from the axial direction. The second overlapping region is larger than the first overlapping region.

With the bicycle disc brake rotor according to the sixteenth aspect, it is possible to utilize a surrounding space of the hub attachment member for the at least one cooling surface, increasing the surface area of the at least one cooling surface.

In accordance with a seventeenth aspect of the present invention, the bicycle disc brake rotor according to any one of the first to sixteenth aspects further comprises a cooling material provided on the at least one cooling surface of the cooling member. The cooling material has a thermal emissivity larger than a thermal emissivity of a material of the cooling member.

With the bicycle disc brake rotor according to the seventeenth aspect, the cooling material further improves cooling efficiency of the bicycle disc brake rotor.

In accordance with an eighteenth aspect of the present invention, the bicycle disc brake rotor according to the seventeenth aspect is configured so that the cooling material covers the at least one cooling surface of the cooling member.

With the bicycle disc brake rotor according to the eighteenth aspect, it is possible to further improve cooling efficiency of the bicycle disc brake rotor.

In accordance with a nineteenth aspect of the present invention, the bicycle disc brake rotor according to any one of the fifth to eighteenth aspects is configured so that the second inner peripheral edge of the cooling member is in contact with the hub attachment member.

With the bicycle disc brake rotor according to the nineteenth aspect, it is possible to conduct heat from the cooling member to the hub attachment member. This further improves cooling efficiency of the bicycle disc brake rotor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
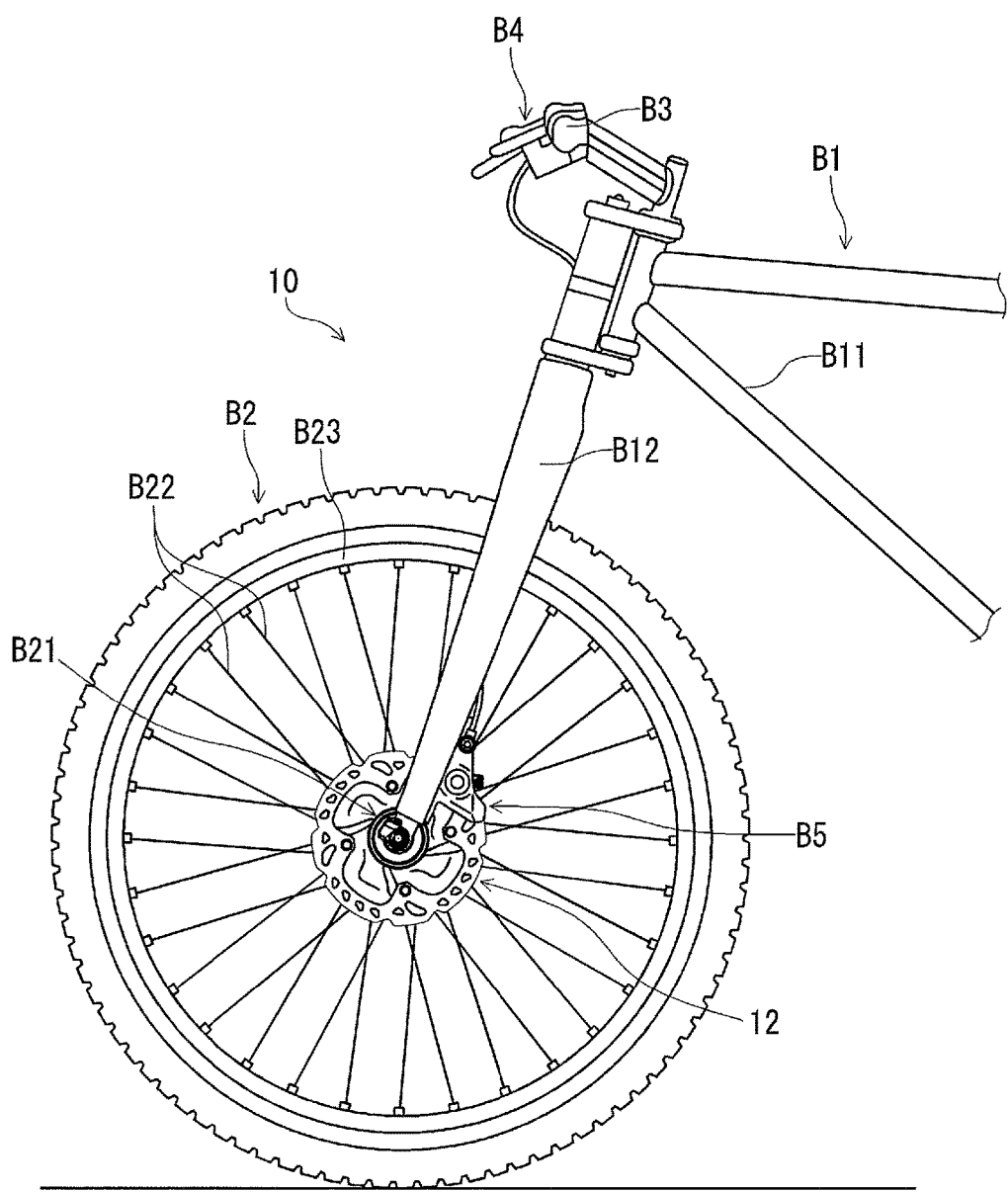
FIG. 1 is a partial side elevational view of a bicycle equipped with a bicycle disc brake rotor in accordance with a first embodiment.

The embodiment(s) will now be described with reference to the accompanying drawings, wherein like reference numerals designate corresponding or identical elements throughout the various drawings.

Referring initially to FIG. 1, a bicycle 10 including a bicycle disc brake rotor 12 in accordance with a first embodiment is illustrated. The bicycle 10 includes a bicycle body B1, a bicycle wheel B2, a handlebar B3, a brake operating device B4, and a disc brake caliper B5. The bicycle wheel B2 includes a bicycle hub assembly B21, spokes B22, and a rim B23. The rim B23 is coupled to the bicycle hub assembly B21 with the spokes B22. The bicycle hub assembly B21 is mounted to the bicycle body B1. In this embodiment, the bicycle body B1 includes a bicycle frame B11 and a front fork B12 rotatably mounted to the front fork B12. The bicycle hub assembly B21 is mounted to the front fork B12. The bicycle disc brake rotor 12 is coupled to the bicycle hub assembly B21. The brake operating device B4 is operatively connected to the disc brake caliper B5. The disc brake caliper B5 applies a braking force to the bicycle disc brake rotor 12 in response to operation of the brake operating device B4. For example, the disc brake caliper B5 includes a first brake pad (not shown) and a second brake pad (not shown). The bicycle disc brake rotor 12 is sandwiched between the first brake pad and the second brake part when the disc brake caliper B5 applies the braking force to the bicycle disc brake rotor 12.

In the illustrated embodiment, the bicycle wheel B2 is a front wheel, and the disc brake caliper B5 is a front disc brake caliper. The bicycle disc brake rotor 12 is a front disc brake rotor mounted to the bicycle hub assembly B21 of the front wheel B2. However, structures of the bicycle disc brake rotor 12 can be applied to a rear disc brake rotor.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of the bicycle 10 with facing the handlebar B3. Accordingly, these terms, as utilized to describe the bicycle disc brake rotor 12, should be interpreted relative to the bicycle 10 equipped with the bicycle disc brake rotor 12 as used in an upright riding position on a horizontal surface.

Figure 2:
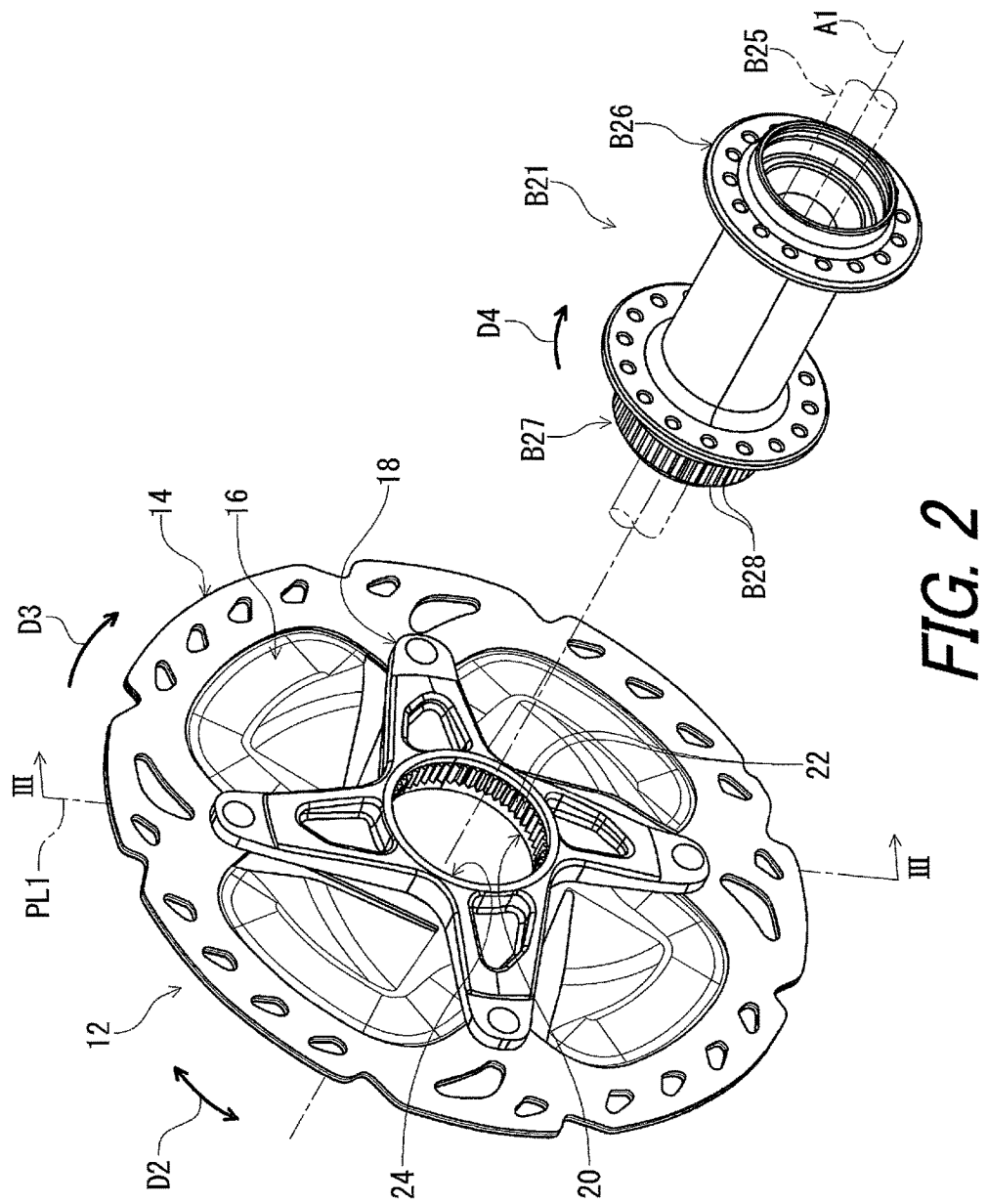
FIG. 2 is a perspective view of the bicycle disc brake rotor illustrated in FIG. 1 with a bicycle hub assembly.

As seen in FIG. 2, the bicycle disc brake rotor 12 comprises a friction member 14 and a cooling member 16. The cooling member 16 is coupled to the friction member 14. The bicycle disc brake rotor 12 further comprises a hub attachment member 18. The hub attachment member 18 is coupled to the friction member 14. The hub attachment member 18 includes a hub engagement structure 20 to engage with the bicycle hub assembly B21.

The bicycle hub assembly B21 includes a hub axle B25 and a hub shell B26. The hub shell B26 is rotatably mounted on the hub axle B25 about a rotational center axis A1. The bicycle disc brake rotor 12 is secured to the hub shell B26 to rotate integrally with the hub shell B26 relative to the hub axle B25 about the rotational center axis A1. Specifically, the hub shell B26 includes a rotor attachment body B27 including outer engagement teeth B28. The hub engagement structure 20 includes inner engagement teeth 22 and an engagement opening 24 defined by the inner engagement teeth 22. The inner engagement teeth 22 mesh with the outer engagement teeth B28 of the hub shell B26.

Figure 3:
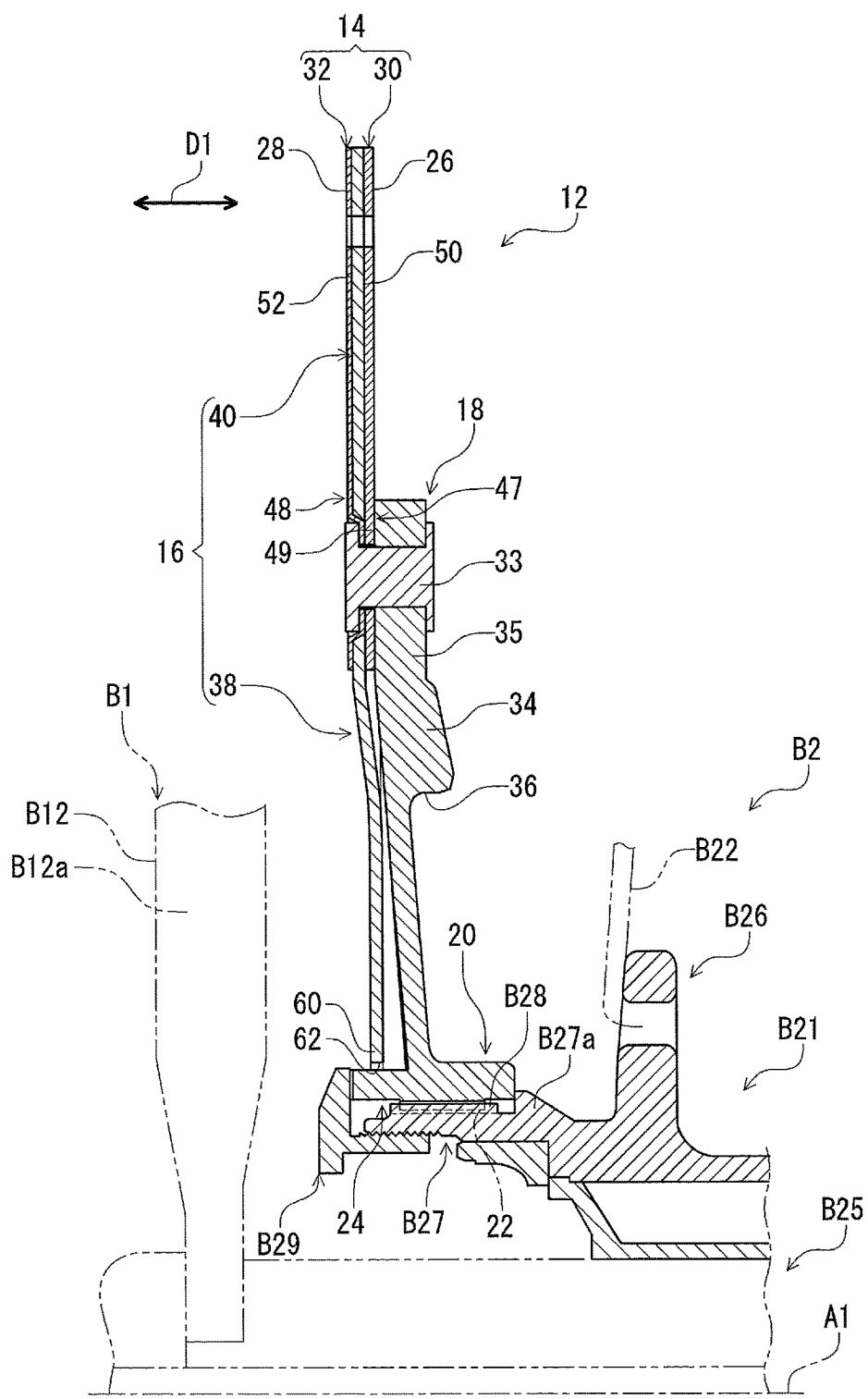
FIG. 3 is a partial cross-sectional view of the bicycle disc brake rotor taken along line of FIG. 2.

As seen in FIG. 3, the bicycle disc brake rotor 12 is secured to the rotor attachment body B27 of the hub shell B26 via a lock ring B29. The hub engagement structure 20 is provided between the lock ring B29 and an annular abutment B27a of the rotor attachment body B27.

The friction member 14 includes at least one friction surface. The friction member 14 includes a first friction surface 26 and a second friction surface 28. The first friction surface 26 is provided as the at least one friction surface. The second friction surface 28 is provided as the at least one friction surface. The second friction surface 28 is opposite to the first friction surface 26 in an axial direction D1 parallel to the rotational center axis A1 of the bicycle disc brake rotor 12.

In this embodiment, the friction member 14 includes a first friction part 30 and a second friction part 32. The first friction part 30 includes the first friction surface 26 provided as the at least one friction surface. The second friction part 32 includes the second friction surface 28 provided as the at least one friction surface.

Figure 4:
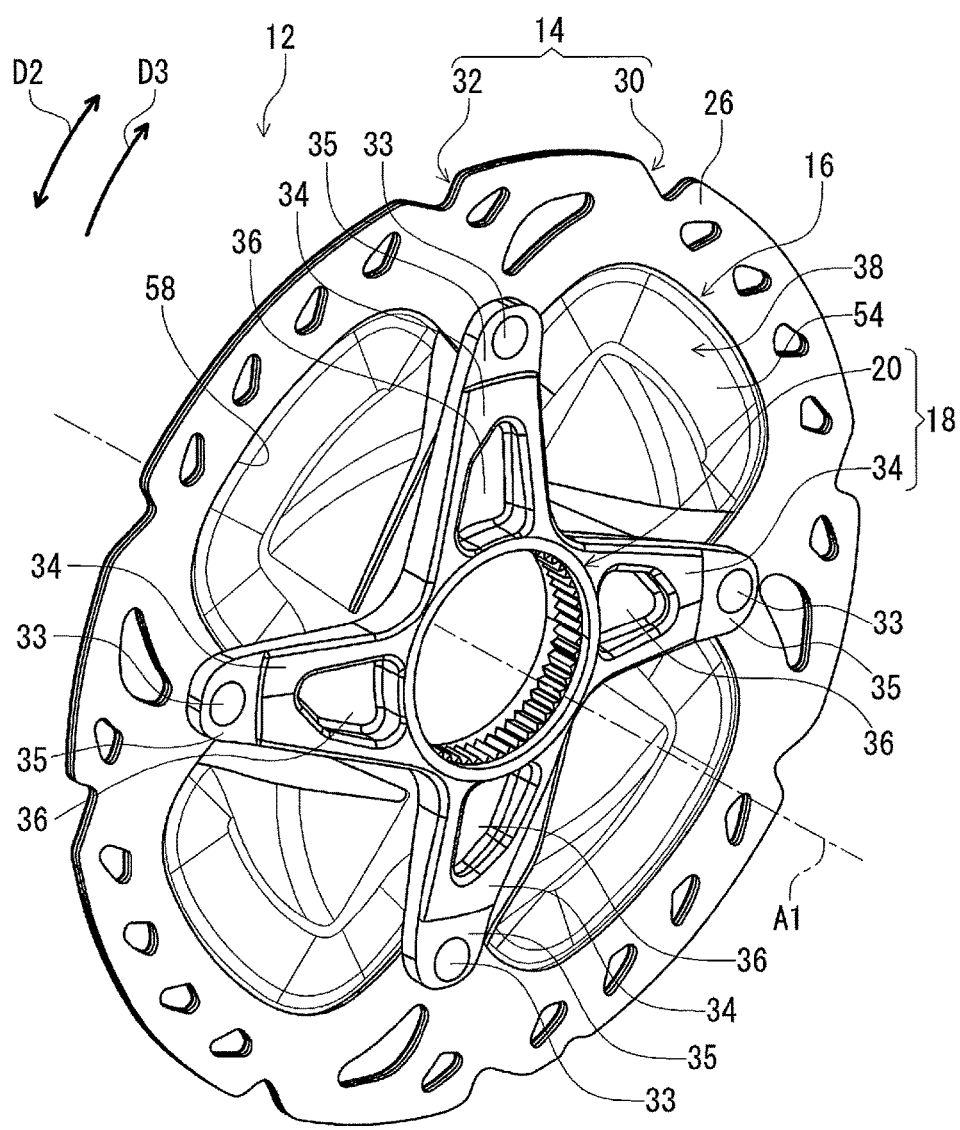
FIG. 4 is a perspective view of the bicycle disc brake rotor illustrated in FIG. 2.
Figure 5:
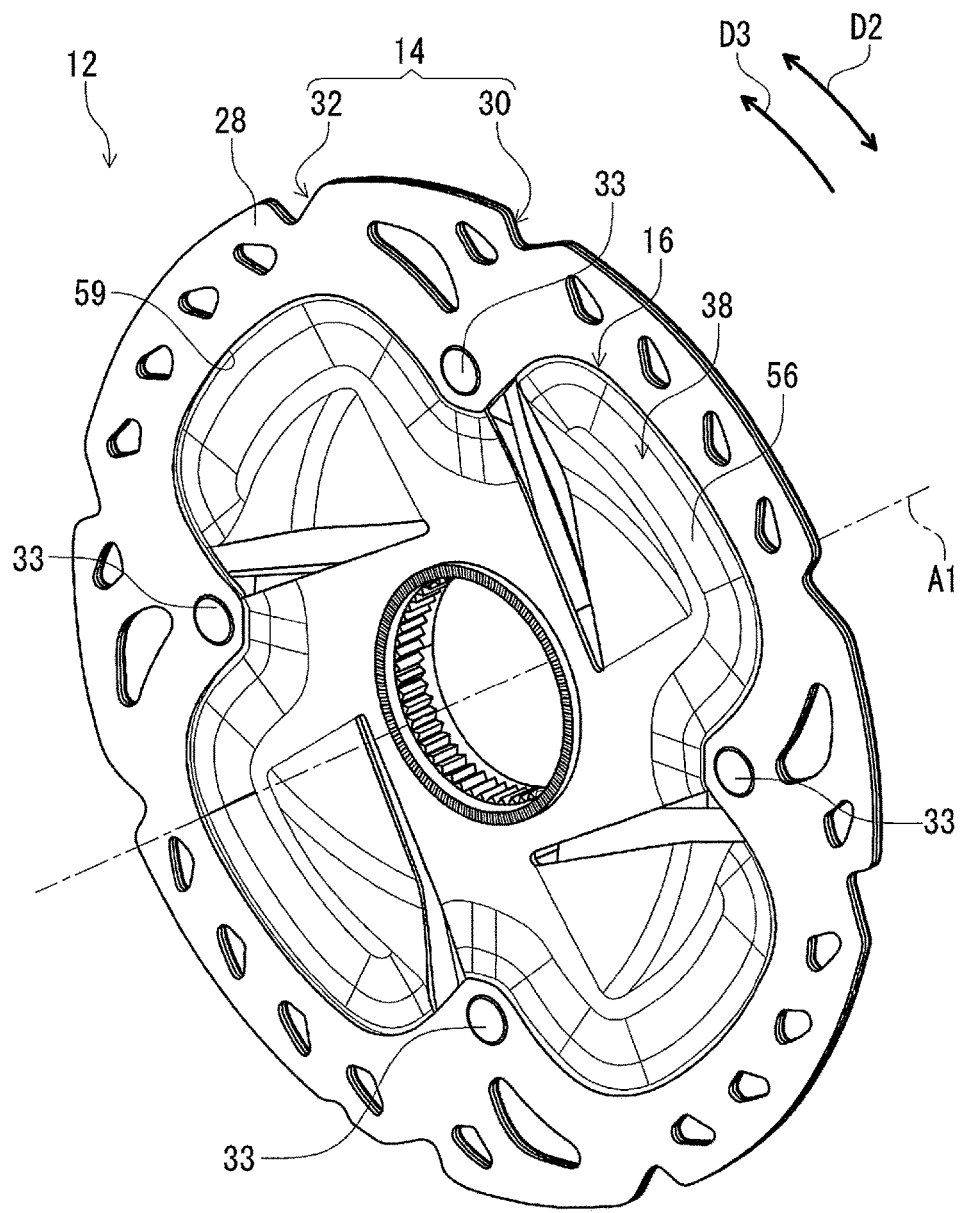
FIG. 5 is a perspective view of the bicycle disc brake rotor illustrated in FIG. 2.

As seen in FIGS. 4 and 5, the bicycle disc brake rotor 12 comprises fasteners 33. The friction member 14 is coupled to the hub attachment member 18 with the fasteners 33. In the illustrated embodiment, the friction member 14 and the cooling member 16 are coupled to the hub attachment member 18 with the fasteners 33. The friction member 14 is coupled to the cooling member 16 with the fasteners 33. In this embodiment, the fasteners 33 are rivets made of a metallic material.

The at least one friction surface 26 and/or 28 has an annular shape. In this embodiment, as seen in FIG. 4, the first friction part 30 has an annular shape. The first friction surface 26 has an annular shape. As seen in FIG. 5, the second friction part 32 has an annular shape. The second friction surface 28 has an annular shape.

As seen in FIG. 4, the hub attachment member 18 includes coupling arms 34 radially outward extending from the hub engagement structure 20. The hub engagement structure 20 has an annular shape. A radially outer end 35 of the coupling arm 34 is coupled to the friction member 14 and the cooling member 16 with the fastener 33. The coupling arm 34 includes a recess 36 provided between the radially outer end 35 and the hub engagement structure 20.

Figure 6:
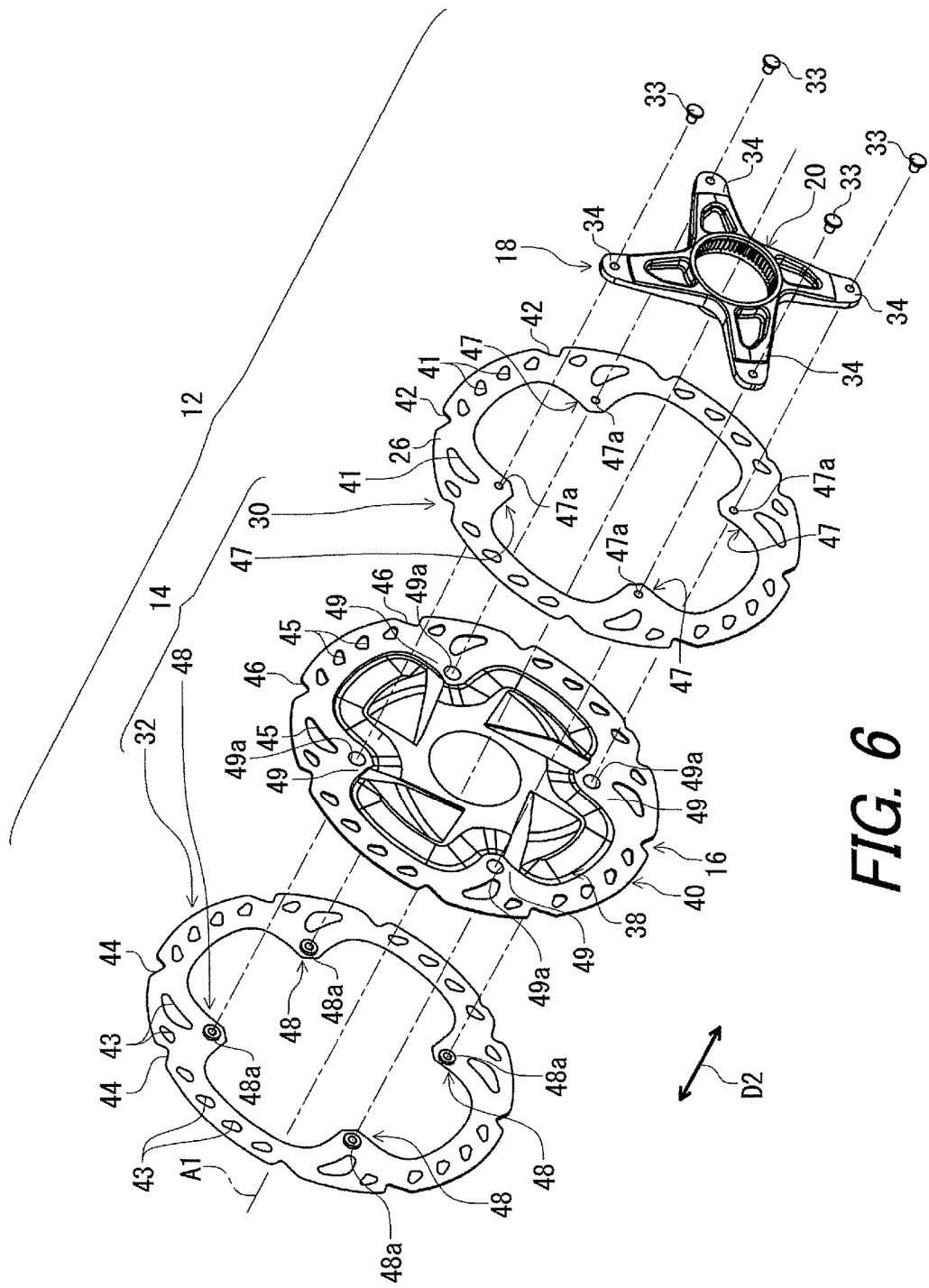
FIG. 6 is an exploded perspective view of the bicycle disc brake rotor illustrated in FIG. 2.

As seen in FIG. 6, the cooling member 16 includes a cooling body 38 and a radially outer part 40. The radially outer part 40 is provided radially outward of the cooling body 38. The friction member 14 is attached to the radially outer part 40 of the cooling member 16. The first friction part 30 is attached to the radially outer part 40 of the cooling member 16. The second friction part 32 is attached to the radially outer part 40 of the cooling member 16.

The first friction part 30 includes first openings 41 and first recesses 42. The second friction part 32 includes second openings 43 and second recesses 44. The first openings 41 are provided at positions corresponding to positions of the second openings 43. The first recesses 42 are provided at positions corresponding to positions of the second recesses 44.

The radially outer part 40 includes third openings 45 and third recesses 46. The third openings 45 are provided at positions corresponding to the positions of the first openings 41 and the positions of the second openings 43. The third recesses 46 are provided at positions corresponding to the positions of the first recesses 42 and the positions of the second recesses 44.

As seen in FIG. 6, the friction member 14 includes first coupling portions 47 and second coupling portions 48. The first coupling portions 47 extends radially inward from the first friction part 30 and are arranged in a circumferential direction D2 defined about the rotational center axis A1. The second coupling portions 48 extends radially inward from the second friction part 32 and are arranged in the circumferential direction D2. The radially outer part 40 includes third coupling portions 49 arranged in the circumferential direction D2. The first coupling portion 47, the second coupling portion 48, and the third coupling portion 49 are coupled to the coupling arm 34 via the fastener 33.

Each of the first coupling portions 47 includes a first coupling hole 47a. Each of the second coupling portions 48 includes a second coupling hole 48a. Each of the third coupling portions 49 includes a third coupling hole 49a. The fastener 33 extends through the first coupling hole 47a, the second coupling hole 48a, and the third coupling hole 49a.

As seen in FIG. 3, the radially outer part 40 is provided between the first friction part 30 and the second friction part 32 in the axial direction D1 parallel to the rotational center axis A1 of the bicycle disc brake rotor 12. The radially outer part 40 includes a first attachment surface 50 and a second attachment surface 52 opposite to the first attachment surface 50 in the axial direction D1. The first friction part 30 is attached to the first attachment surface 50. The second friction part 32 is attached to the second attachment surface 52. The third coupling portion 49 is provided between the first coupling portion 47 and the second coupling portion 48 in the axial direction D1.

The friction member 14 is made of a first material. The cooling member 16 is made of a second material different from the first material. In this embodiment, the first friction part 30 is made of the first material. The second friction part 32 is made of the first material. However, the second friction part 32 can be made of a material different from a material of the first friction part 30.

The first material has a first thermal conductivity. The second material has a second thermal conductivity. The second thermal conductivity is larger than the first thermal conductivity. For example, the first material includes stainless steel. The second material includes aluminum. However, the first material can include another material instead of or in addition to stainless steel. The second material can include another material instead of or in addition to aluminum.

Figure 7:
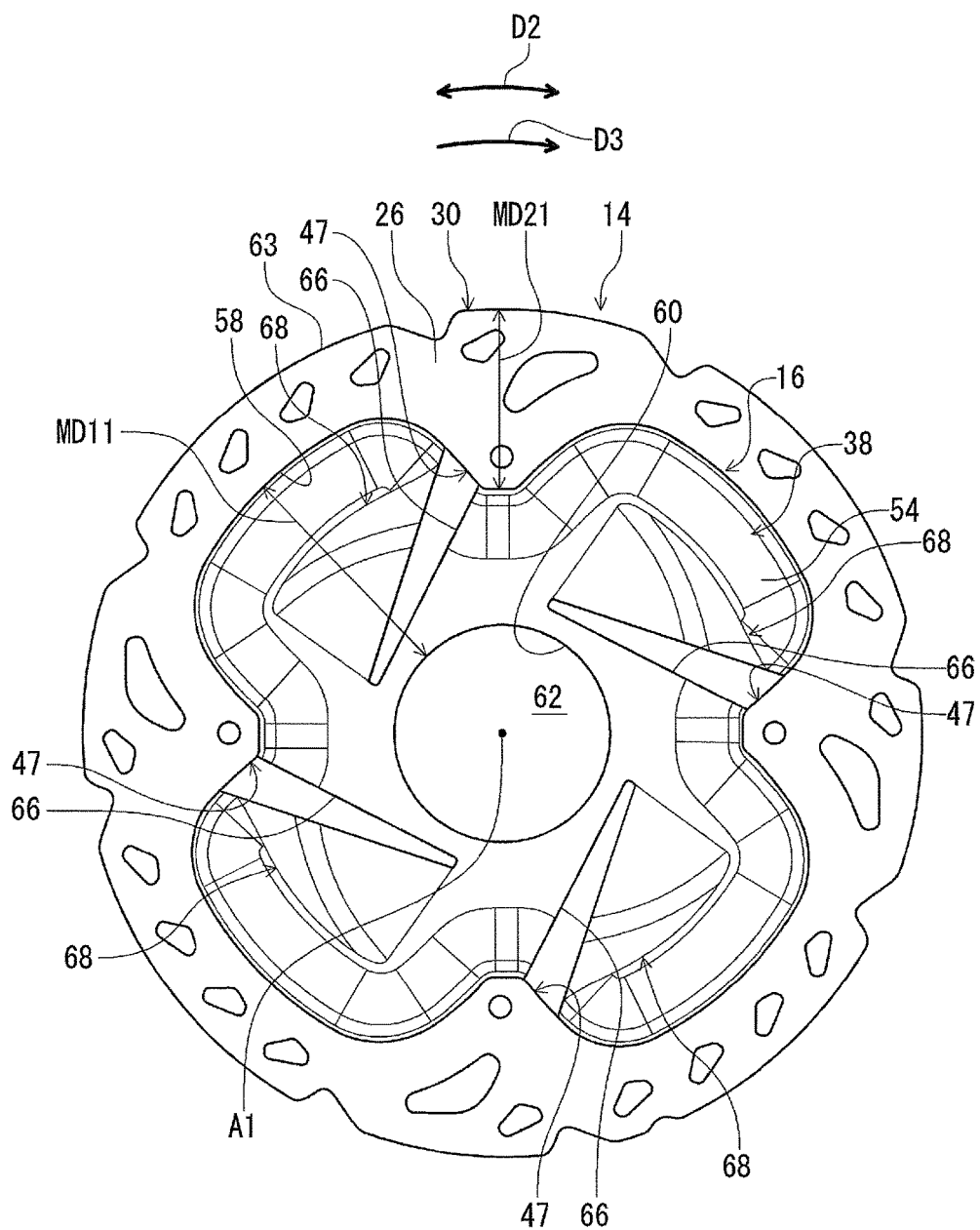
FIG. 7 is a side elevational view of the bicycle disc brake rotor illustrated in FIG. 2 with a hub attachment member omitted.
Figure 8:
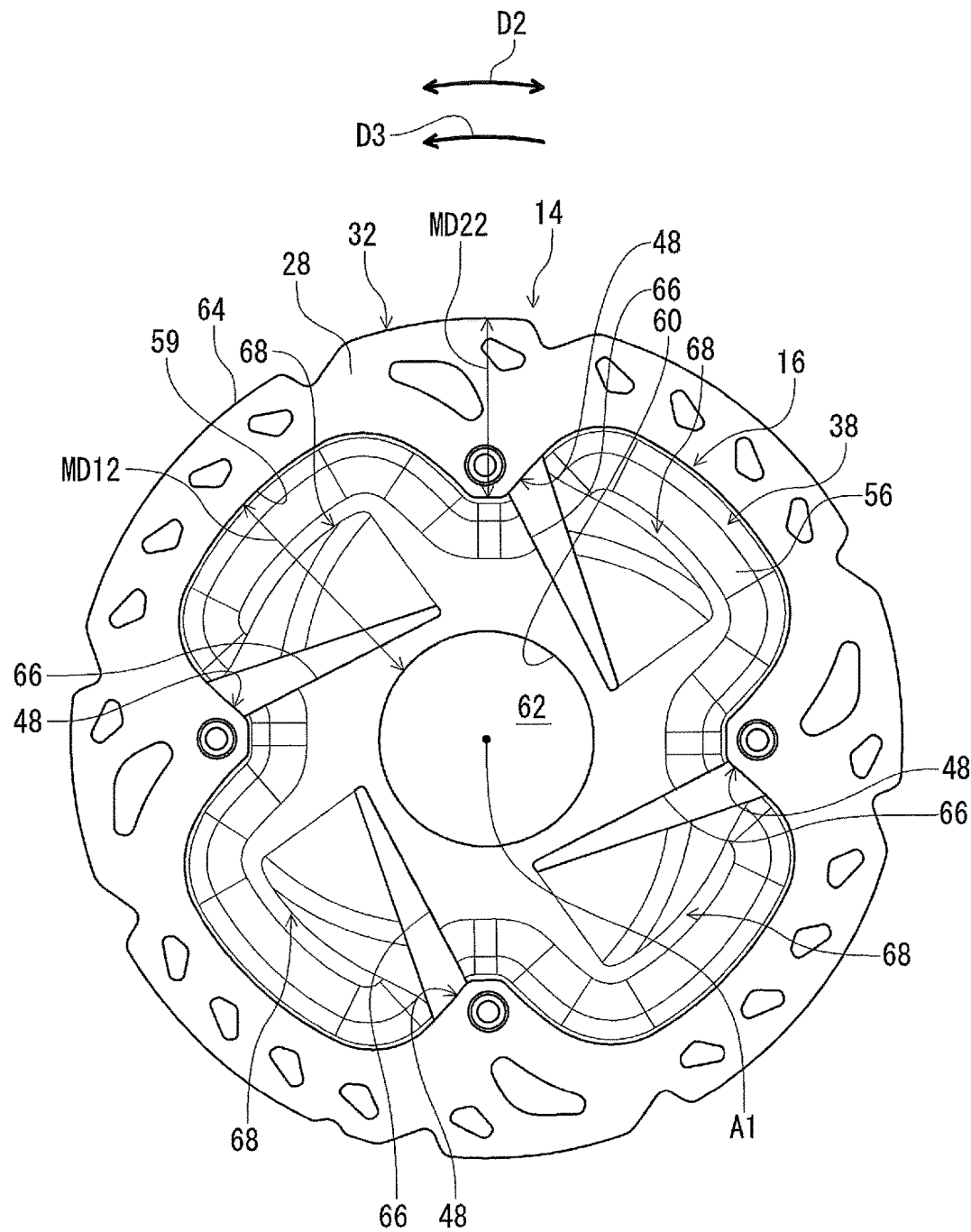
FIG. 8 is a side elevational view of the bicycle disc brake rotor illustrated in FIG. 2 with the hub attachment member omitted.

As seen in FIGS. 7 and 8, the cooling member 16 includes at least one cooling surface 54 and/or 56. Specifically, the cooling body 38 includes the at least one cooling surface 54 and/or 56. The at least one cooling surface 54 and/or 56 is provided in the annular shape of the at least one friction surface 26 and/or 28 with respect to the rotational center axis A1.

As seen in FIGS. 4 and 7, the cooling member 16 includes a first cooling surface 54. The first cooling surface 54 is provided as the at least one cooling surface. The first cooling surface 54 is provided in the annular shape of the first friction surface 26 with respect to the rotational center axis A1.

As seen in FIGS. 5 and 8, the cooling member 16 includes a second cooling surface 56. The second cooling surface 56 is provided as the at least one cooling surface. The second cooling surface 56 is provided in the annular shape of the second friction surface 28 with respect to the rotational center axis A1. As seen in FIG. 3, the second cooling surface 56 is opposite to the first cooling surface 54 in the axial direction D1.

As seen in FIGS. 7 and 8, the at least one cooling surface 54 and/or 56 is disposed not to overlap with the at least one friction surface 26 and/or 28 when viewed from the axial direction D1 parallel to the rotational center axis A1 of the bicycle disc brake rotor 12. The at least one cooling surface 54 and/or 56 is provided radially inward of the at least one friction surface 26 and/or 28 with respect to the rotational center axis A1 of the bicycle disc brake rotor 12.

As seen in FIG. 7, the first cooling surface 54 is disposed not to overlap with the first friction surface 26 when viewed from the axial direction D1. The first cooling surface 54 is provided radially inward of the first friction surface 26 with respect to the rotational center axis A1. The first cooling surface 54 is provided in the annular shape of the first friction surface 26 with respect to the rotational center axis A1.

As seen in FIG. 8, the second cooling surface 56 is disposed not to overlap with the second friction surface 28 when viewed from the axial direction D1. The second cooling surface 56 is provided radially inward of the second friction surface 28 with respect to the rotational center axis A1. The second cooling surface 56 is provided in the annular shape of the second friction surface 28 with respect to the rotational center axis A1.

As seen in FIGS. 7 and 8, the friction member 14 includes a first inner peripheral edge. Specifically, the first friction part 30 includes a first inner peripheral edge 58 (FIG. 7). The first inner peripheral edge 58 is defined by the first friction part 30 and the first coupling portions 47. The second friction part 32 includes a first inner peripheral edge 59 (FIG. 8). The first inner peripheral edge 59 is defined by the second friction part 32 and the second coupling portions 48.

The cooling member 16 includes a second inner peripheral edge 60 provided radially inward of the first inner peripheral edge 58 with respect to the rotational center axis A1. The cooling member 16 includes a center opening 62 defined by the second inner peripheral edge 60.

In this embodiment, as seen in FIG. 7, the second inner peripheral edge 60 is provided radially inward of the first inner peripheral edge 58 of the first friction part 30 with respect to the rotational center axis A1. As seen in FIG. 8, the second inner peripheral edge 60 is provided radially inward of the first inner peripheral edge 59 of the second friction part 32 with respect to the rotational center axis A1.

As seen in FIGS. 7 and 8, the friction member 14 includes an outer peripheral edge. Specifically, the first friction part 30 includes an outer peripheral edge 63 (FIG. 7). The second friction part 32 includes an outer peripheral edge 64 (FIG. 8). As seen in FIG. 7, a maximum distance MD11 which is radially defined between the first inner peripheral edge 58 and the second inner peripheral edge 60 is longer than a maximum distance MD21 which is radially defined between the first inner peripheral edge 58 and the outer peripheral edge 63. As seen in FIG. 8, a maximum distance MD12 which is radially defined between the first inner peripheral edge 59 and the second inner peripheral edge 60 is longer than a maximum distance MD22 which is radially defined between the first inner peripheral edge 59 and the outer peripheral edge 64.

As seen in FIG. 7, the cooling member 16 includes at least one opening provided radially outward of the center opening 62. In this embodiment, the cooling member 16 includes openings 66 provided radially outward of the center opening 62. A total number of openings 66 is not limited to this embodiment. While the opening 66 has an elongated shape in this embodiment, the shape of the opening 66 is not limited to this embodiment.

The cooling member 16 including an air intake 68. In this embodiment, the cooling member 16 includes air intakes 68 arranged in the circumferential direction D2 at a constant pitch. The air intakes 68 are provided radially between the friction member 14 and the second inner peripheral edge 60.

Figure 9:
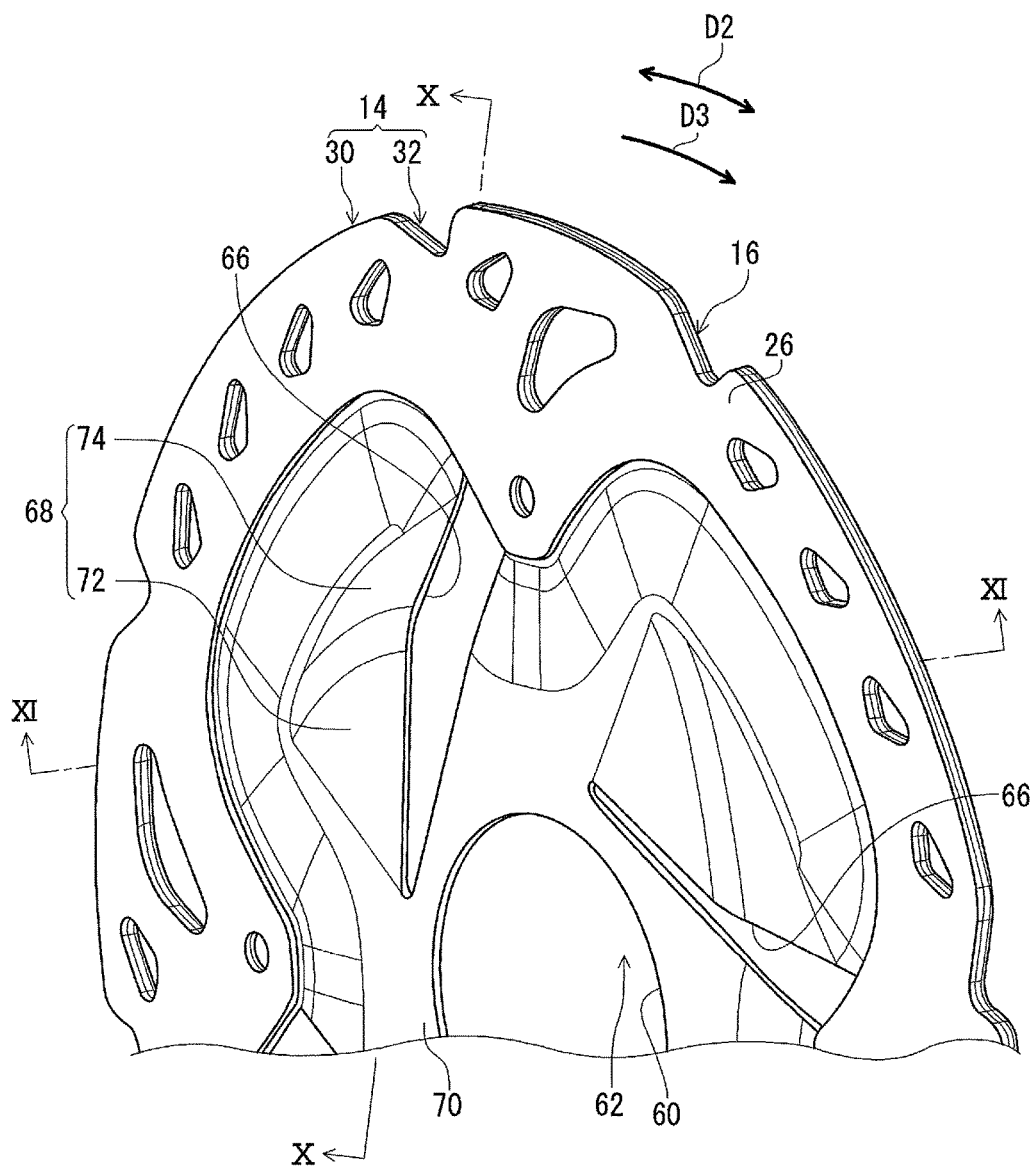
FIG. 9 is a partial perspective view of the bicycle disc brake rotor illustrated in FIG. 2.

As seen in FIG. 9, the air intake 68 includes the opening 66. The opening 66 faces toward a downstream side of a rotational direction D3 with respect to the rotational center axis A1 of the bicycle disc brake rotor 12. The rotational direction D3 of the bicycle disc brake rotor 12 corresponds to a direction D4 in which the hub shell B26 (FIG. 2) of the bicycle hub assembly B21 rotates when the bicycle 10 (FIG. 1) moves forward. The rotational direction D3 is defined as one direction of the circumferential direction D2.

In this embodiment, the cooling member 16 includes a base part 70. The base part 70 and the air intakes 68 constitute the cooling body 38. The base part 70 includes the second inner peripheral edge 60 defining the center opening 62.

Figure 10:
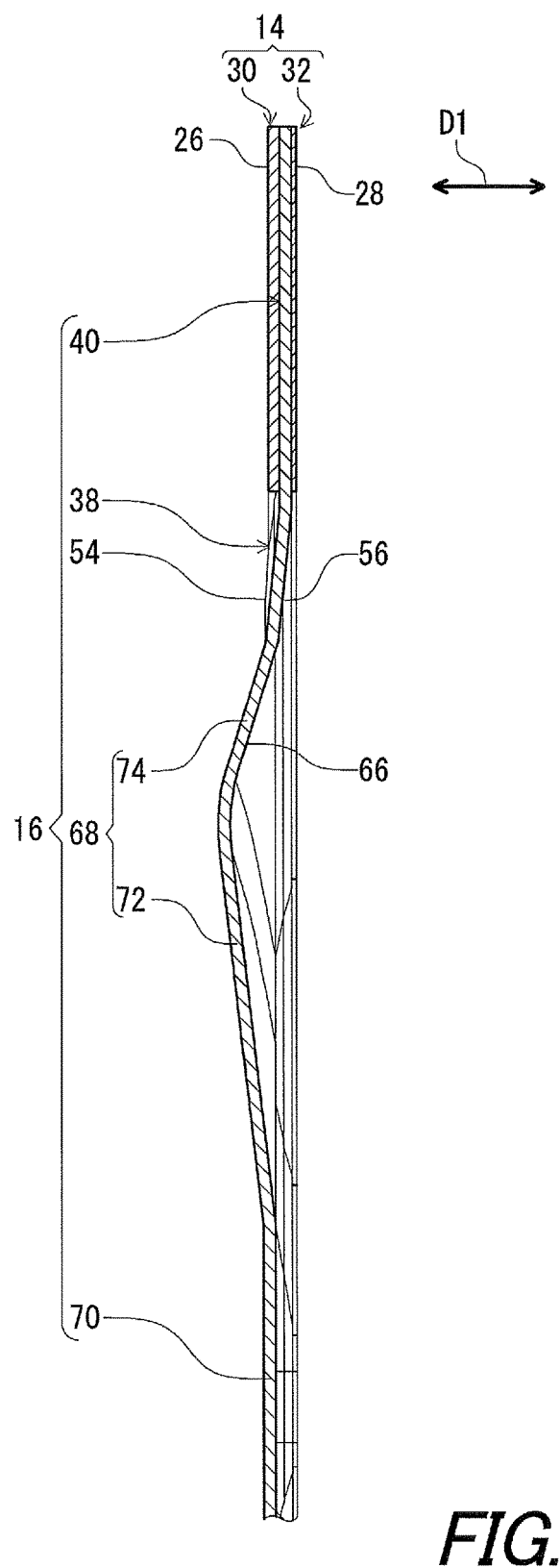
FIG. 10 is a partial cross-sectional view of the bicycle disc brake rotor taken along line X-X of FIG. 9.
Figure 11:
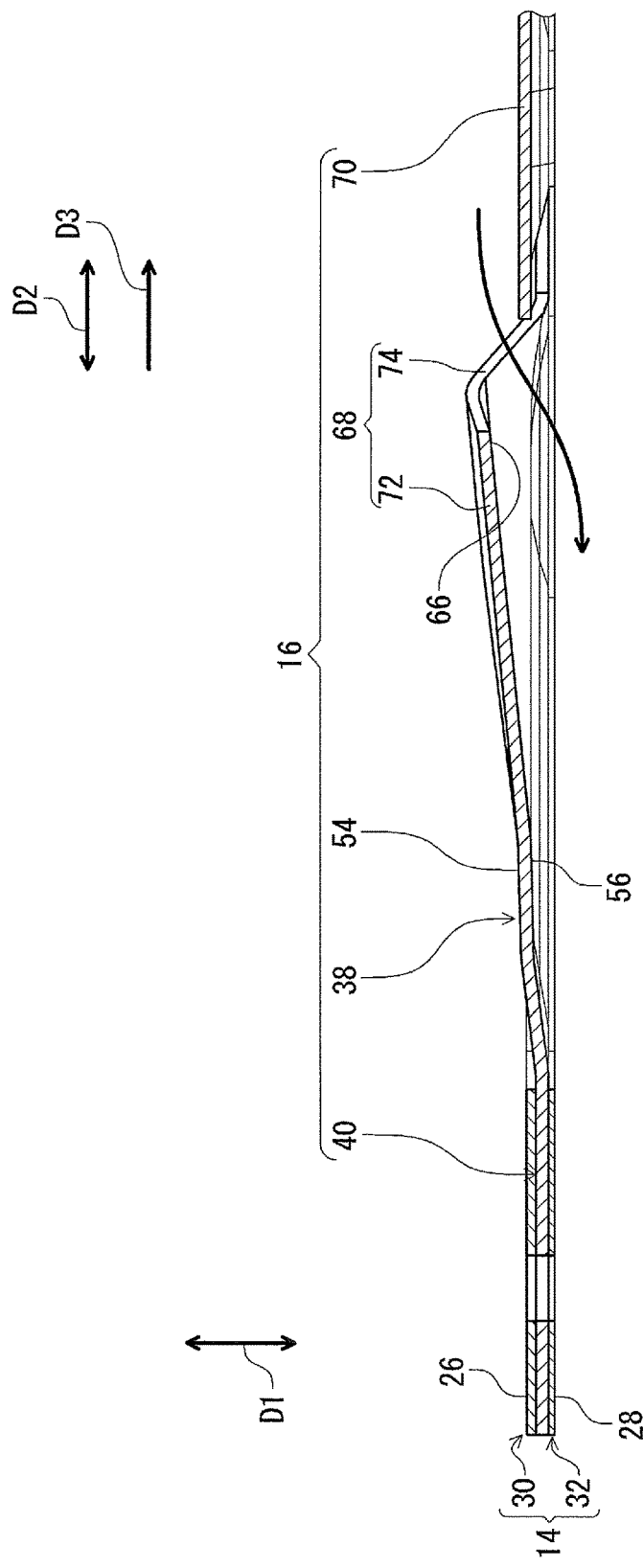
FIG. 11 is a partial cross-sectional view of the bicycle disc brake rotor taken along line XI-XI of FIG. 9.

As seen in FIGS. 10 and 11, the air intake 68 protrudes from the base part 70 in the axial direction D1. The air intake 68 has a convex shape. Specifically, the air intake 68 includes a first inclined part 72 and a second inclined part 74. The first inclined part 72 has a plate shape and is inclined relative to the axial direction D1. The second inclined part 74 has a plate shape and is inclined relative to the axial direction D1. The first inclined part 72 is coupled to the base part 70 and the second inclined part 74. The second inclined part 74 is coupled to the base part 70 and the first inclined part 72. The first inclined part 72 is provided radially inward of the second inclined part 74.

Figure 12:
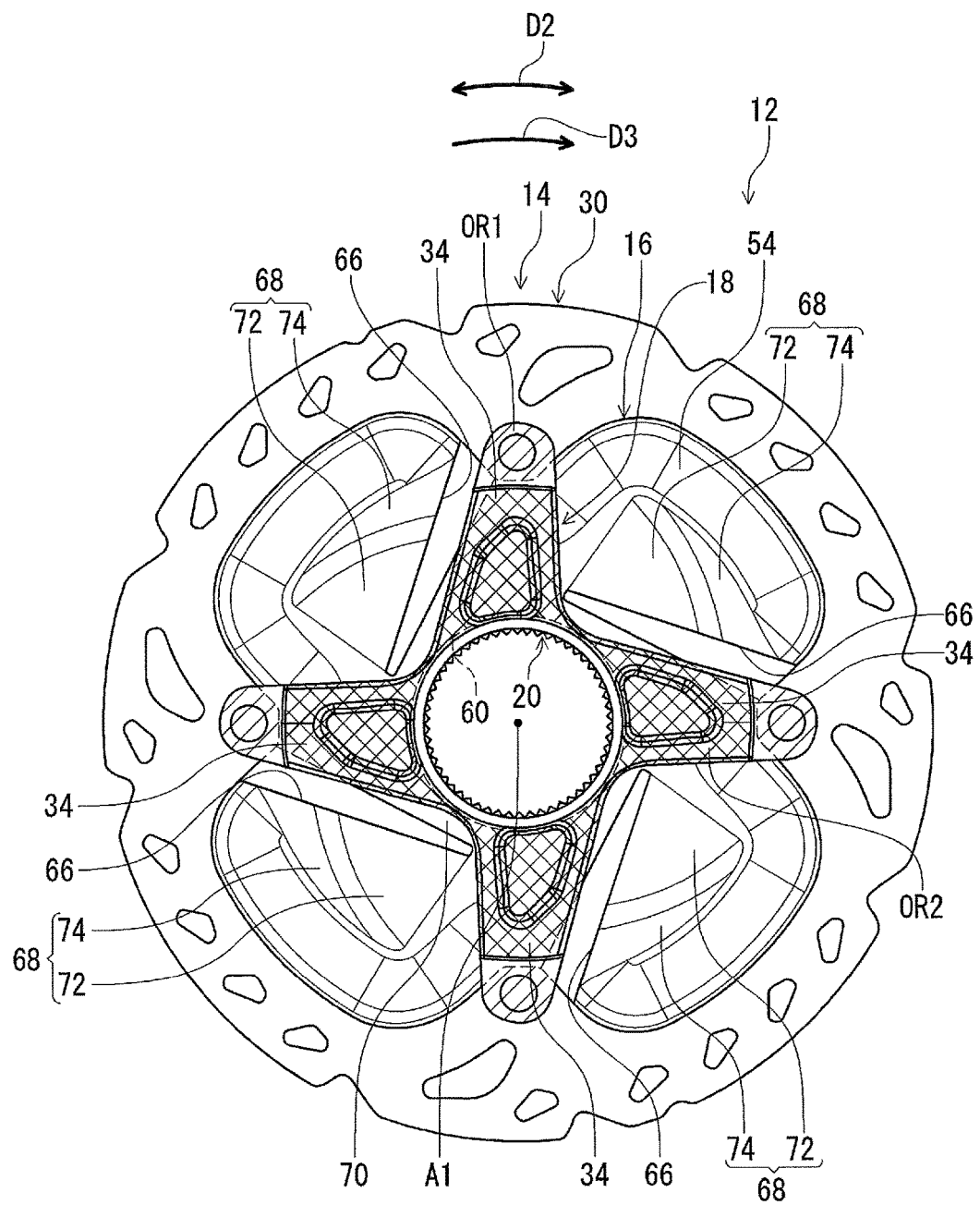
FIG. 12 is a side elevational view of the bicycle disc brake rotor illustrated in FIG. 2.

As seen in FIG. 12, the air intake 68 is provided between adjacent two of the coupling arms 34 in the circumferential direction D2. The openings 66 are respectively adjacent to the coupling arms 34 when viewed from the axial direction D1. The openings 66 respectively extend along the coupling arms 34 when viewed from the axial direction D1.

Figure 13:
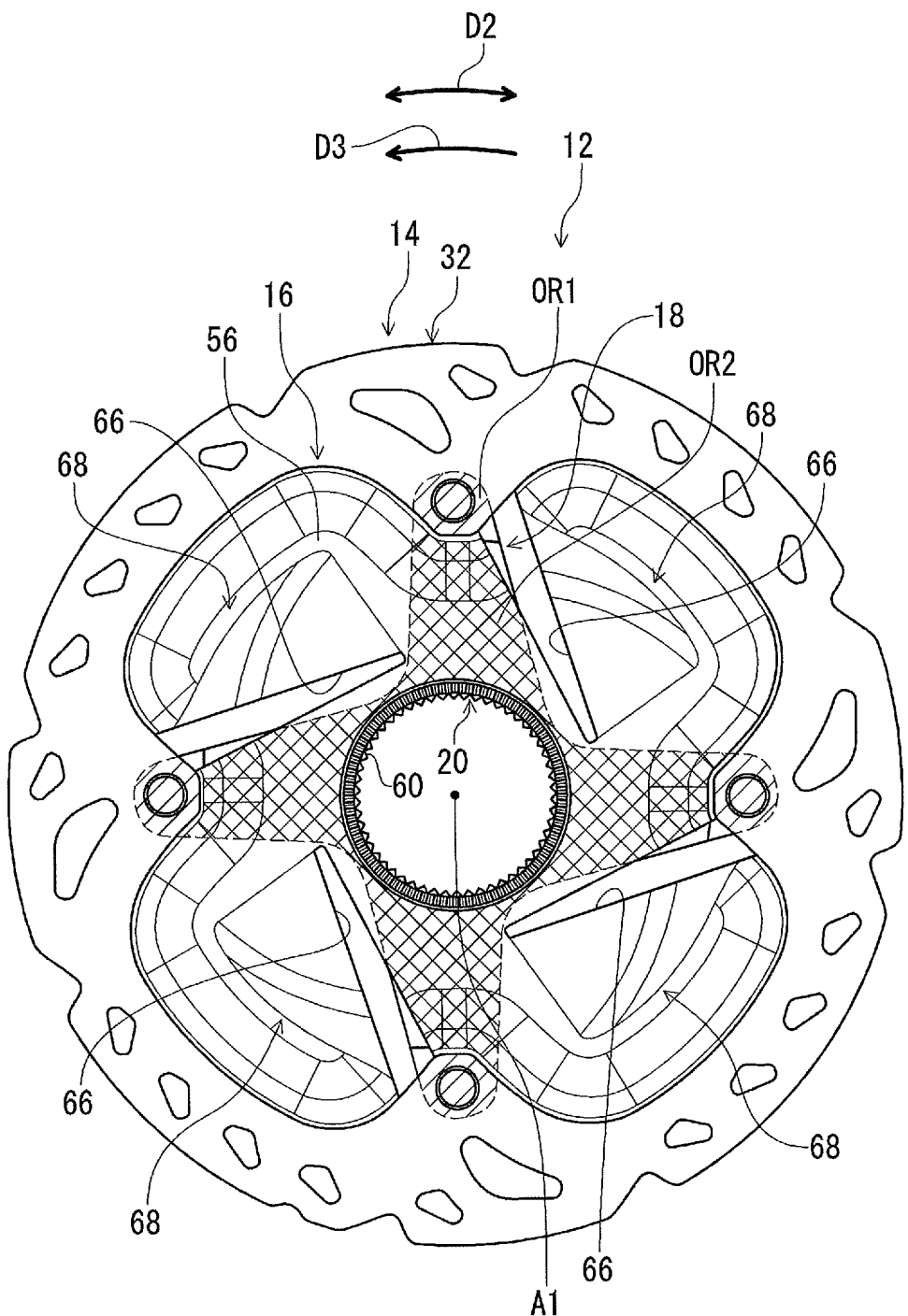
FIG. 13 is a side elevational view of the bicycle disc brake rotor illustrated in FIG. 2.

As seen in FIGS. 12 and 13, the hub attachment member 18 overlaps with the friction member 14 to define a first overlapping region OR1 when viewed from the axial direction D1 parallel to the rotational center axis A1 of the bicycle disc brake rotor 12. The hub attachment member 18 overlaps with the at least one cooling surface 54 and/or 56 to define a second overlapping region OR2 when viewed from the axial direction D1. The first overlapping region OR1 is indicated with single hatching. The second overlapping region OR2 is indicated with cross hatching. The second overlapping region OR2 is larger than the first overlapping region OR1. However, the second overlapping region OR2 can be equal to or smaller than the first overlapping region OR1.

Figure 14:
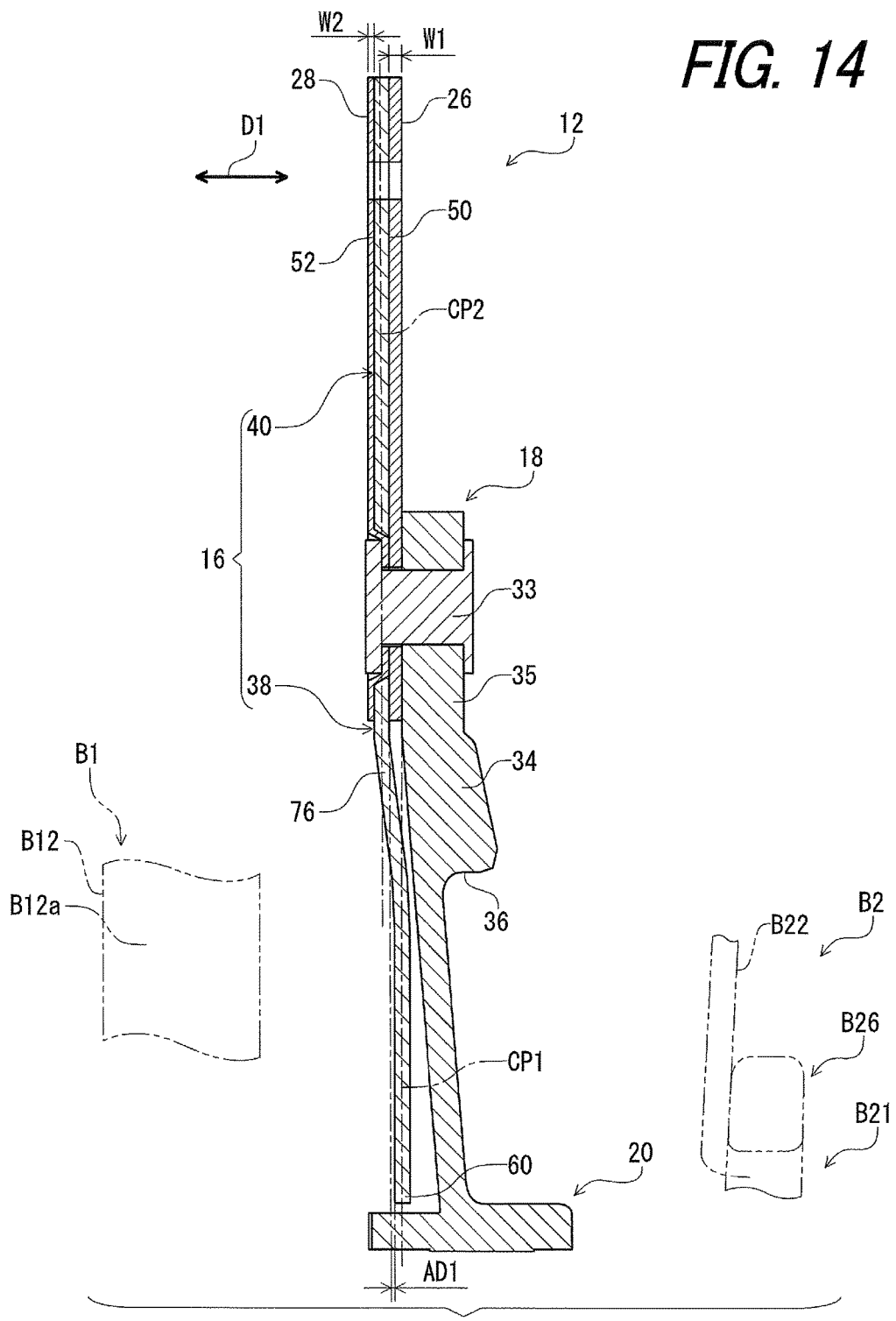
FIG. 14 is an enlarged partial cross-sectional view of the bicycle disc brake rotor illustrated in FIG. 2.

As seen in FIG. 14, the second inner peripheral edge 60 is offset from the radially outer part 40 in the axial direction D1 parallel to the rotational center axis A1 of the bicycle disc brake rotor 12. The second inner peripheral edge 60 of the cooling member 16 is offset from the radially outer part 40 toward the hub attachment member 18 in the axial direction D1. Specifically, an axial center plane CP1 of the second inner peripheral edge 60 is offset from an axial center plane CP2 of the radially outer part 40 toward the hub attachment member 18 in the axial direction D1. The axial center plane CP1 is perpendicular to the axial direction D1 and is defined at a center of a width of the second inner peripheral edge 60 in the axial direction D1. The axial center plane CP2 is perpendicular to the axial direction D1 and is defined at a center of a width of the radially outer part 40 in the axial direction D1.

In this embodiment, the first friction surface 26 of the first friction part 30 is provided substantially on the axial center plane CP1 of the second inner peripheral edge 60. The second inner peripheral edge 60 is offset from the radially outer part 40 in the axial direction D1 beyond the at least one friction surface 26 and/or 28. Specifically, the second inner peripheral edge 60 is offset from the radially outer part 40 in the axial direction D1 beyond the first friction surface 26. An axial distance AD1 defined between the first attachment surface 50 and the second inner peripheral edge 60 in the axial direction D1 is greater than 0 mm and equal to or less than 1 mm.

The second inner peripheral edge 60 is farther from the bicycle body B1 of the bicycle 10 than the radially outer part 40 in the axial direction D1 in a state where the bicycle disc brake rotor 12 is mounted to the bicycle body B1. In this embodiment, the second inner peripheral edge 60 is farther from a fork arm B12a of the front fork B12 of the bicycle body B1 than the radially outer part 40 in the axial direction D1 in the state where the bicycle disc brake rotor 12 is mounted to the bicycle body B1.

As seen in FIG. 14, the first friction part 30 has a first axial width W1 defined in the axial direction D1. The second friction part 32 has a second axial width W2 defined in the axial direction D1. While the first axial width W1 is larger than the second axial width W2 in this embodiment, the first axial width W1 can be equal to or smaller than the second axial width W2.

The cooling body 38 includes a curved part 76 provided between the radially outer part 40 and the second inner peripheral edge 60. The curved part 76 has a curved convex cross section taken along a plane PL1 (FIG. 2) defined on the rotational center axis A1. The rotational center axis A1 is included in the plane PL1. The curved convex cross section protrudes away from the bicycle body B1 of a bicycle in the state where the bicycle disc brake rotor 12 is mounted to the bicycle body B1.

Figure 15:
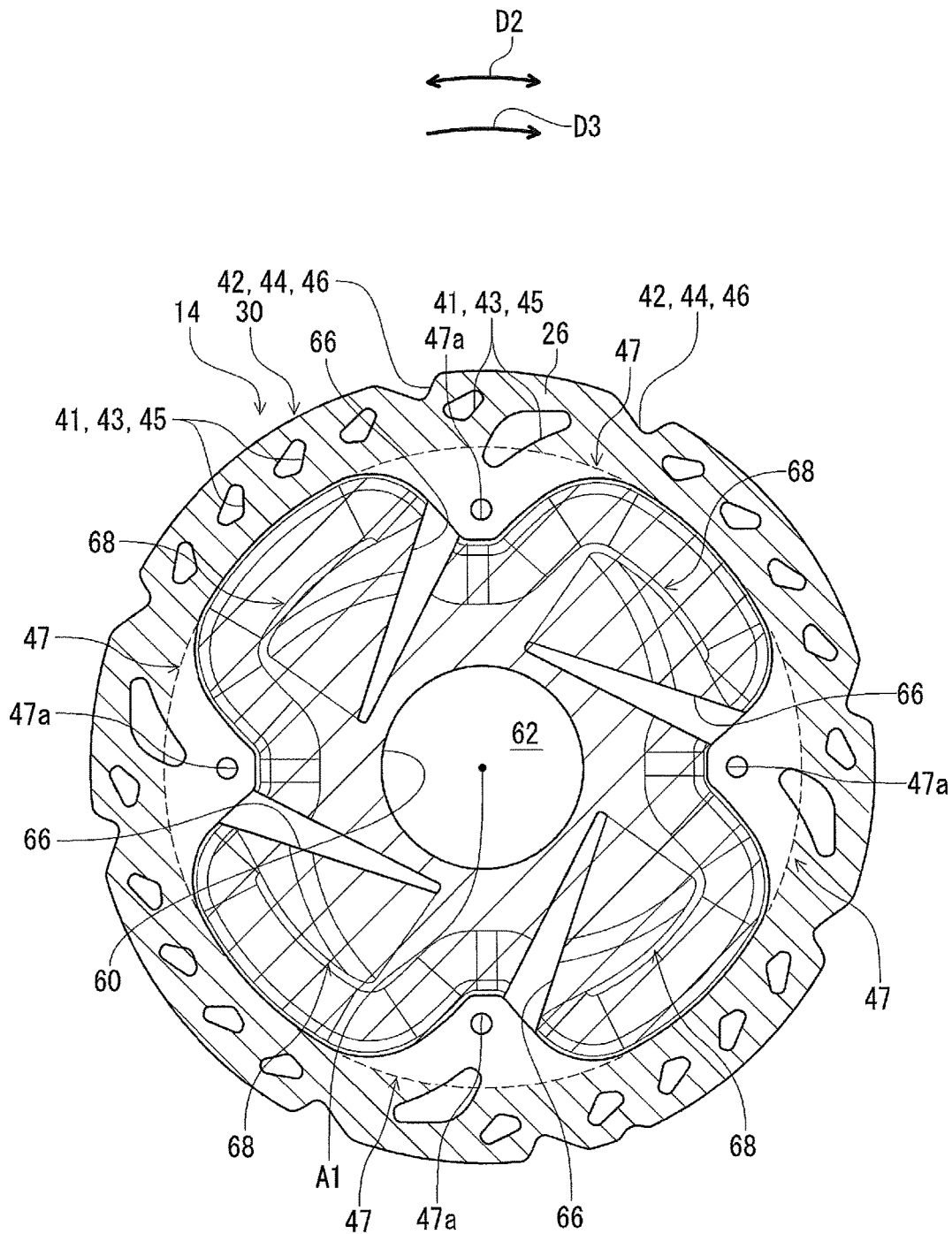
FIG. 15 is a side elevational view of the bicycle disc brake rotor illustrated in FIG. 2 with the hub attachment member omitted.
Figure 16:
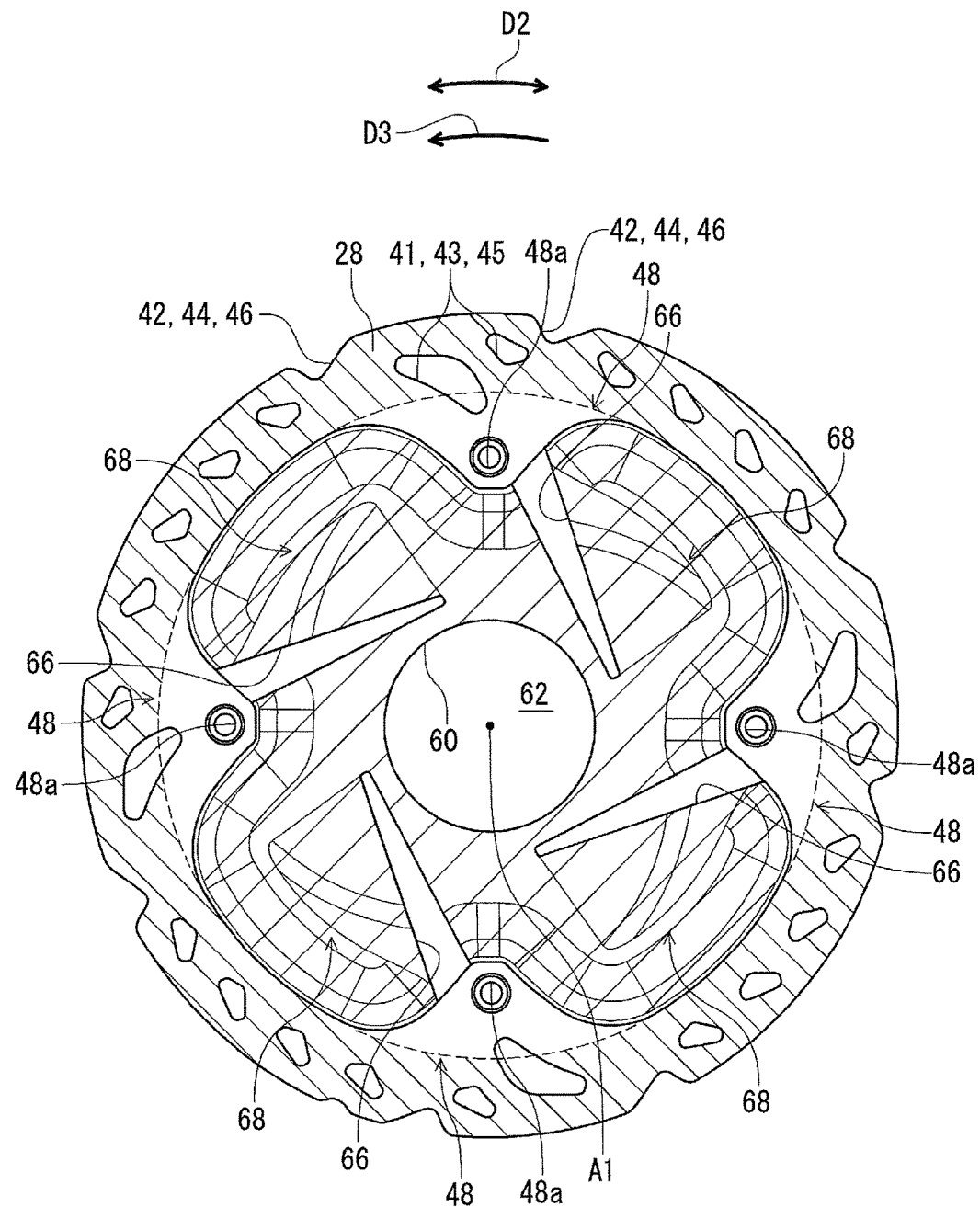
FIG. 16 is a side elevational view of the bicycle disc brake rotor illustrated in FIG. 2 with the hub attachment member omitted.

As seen in FIG. 15, a surface area of the first friction surface 26 is indicated with hatching, and a surface area of the first cooling surface 54 is indicated with hatching. As seen in FIG. 16, a surface area of the second friction surface 28 is indicated with hatching, and a surface area of the second cooling surface 56 is indicated with hatching. The surface area of the first friction surface 26 does not include areas of the first openings 41 and the first recesses 42. The surface area of the second friction surface 28 does not include areas of the second openings 43 and the second recesses 44.

A surface area of the at least one cooling surface 54 and/or 56 is equal to or larger than 110% of a surface area of the at least one friction surface 26 and/or 28. In this embodiment, the surface area of the at least one cooling surface 54 and/or 56 is equal to or larger than 110% of a total surface area of the first and second friction surfaces 26 and 28. Specifically, a total surface area of the first and second cooling surfaces 54 and 56 is equal to or larger than 110% of the total surface area of the first and second friction surfaces 26 and 28.

In this embodiment, the surface area of the at least one cooling surface 54 and/or 56 is equal to or smaller than 200% of the surface area of the at least one friction surface 26 and/or 28. The surface area of the at least one cooling surface 54 and/or 56 is equal to or smaller than 200% of the total surface area of the first and second friction surfaces 26 and 28. The total surface area of the first and second cooling surfaces 54 and 56 is equal to or smaller than 200% of the total surface area of the first and second friction surfaces 26 and 28.

For example, in a case where an outer diameter of the bicycle disc brake rotor 12 is 160 mm, the total surface area of the first and second cooling surfaces 54 and 56 is 17379 mm$^2$, and the total surface area of the first and second friction surfaces 26 and 28 is 10450 mm$^2$. In this case, the total surface area of the first and second cooling surfaces 54 and 56 is substantially equal to 166.3% of the total surface area of the first and second friction surfaces 26 and 28.

When a temperature of the friction member 14 is simulated under the following calculation conditions (CC-1) to (CC-4).

(CC-1) Surrounding temperature: 25° C.
(CC-2) Amount of heat generation of the friction member 14: 535 W
(CC-3) Wind speed: 15 km/h
(CC-4) Rotational speed of the bicycle disc brake rotor 12: zero The amount of heat generation of the friction member 14 is caused by friction between the first friction surface 26 and the first brake pad (not shown) and between the second friction surface 28 and the second brake pad (not shown). Under the above calculation conditions (CC-1) to (CC-4), a simulated temperature of the friction member 14 is 226.4° C.

Figure 17:
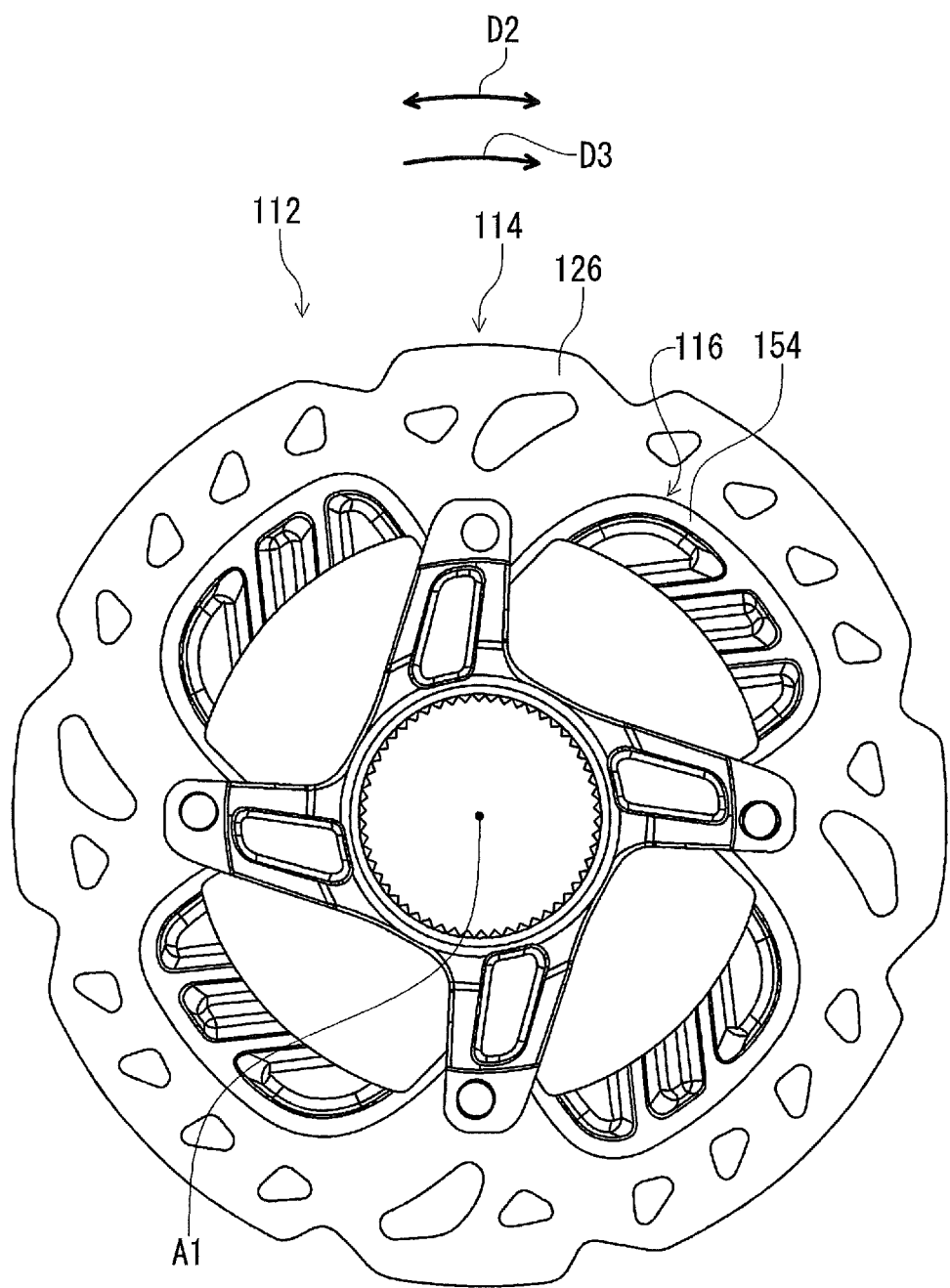
FIG. 17 is a side elevational view of a bicycle disc brake rotor of a comparative example.
Figure 18:
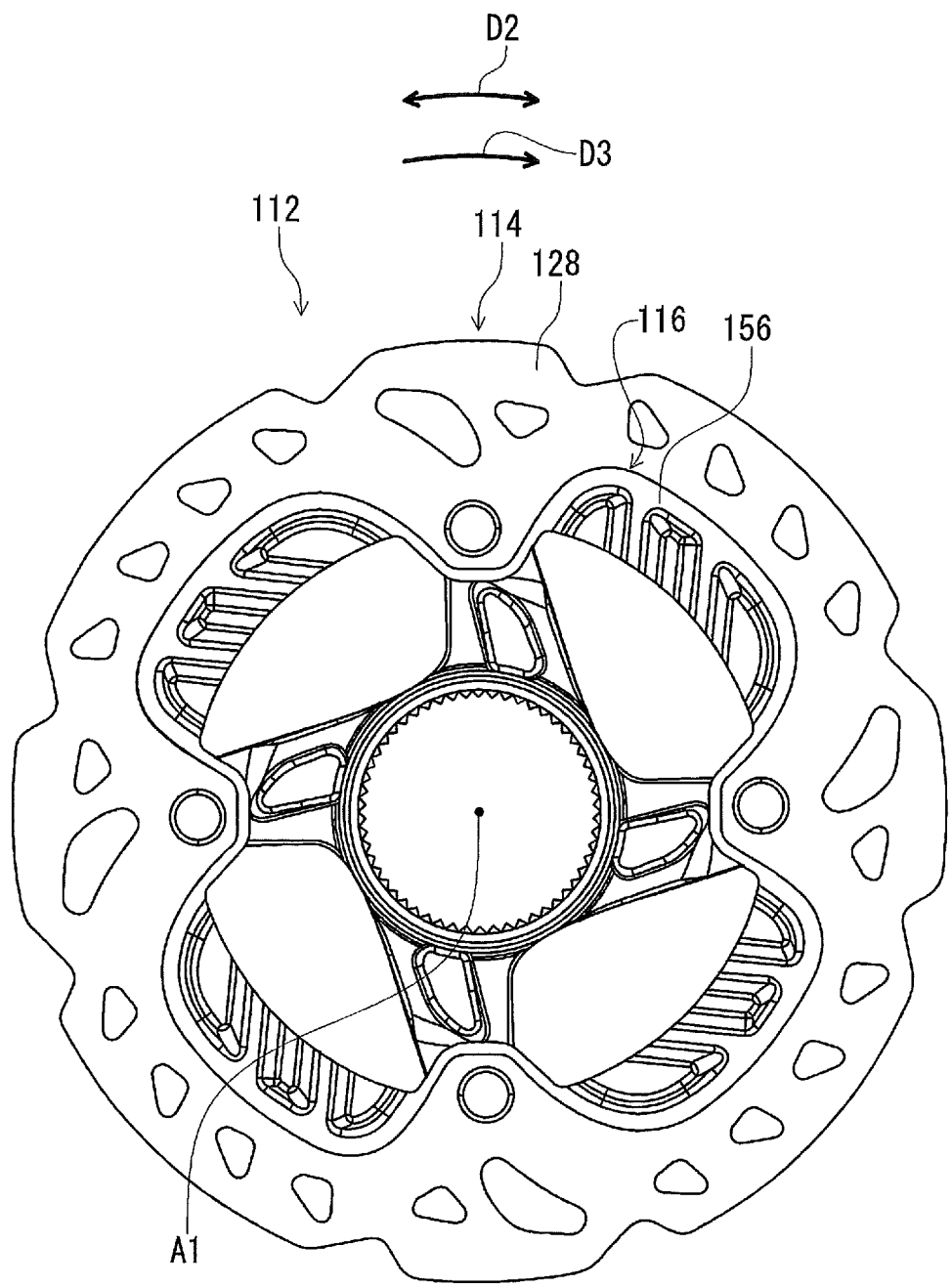
FIG. 18 is a side elevational view of the bicycle disc brake rotor of the comparative example.

FIGS. 17 and 18 illustrate a bicycle disc brake rotor 112 as a comparative example. The bicycle disc brake rotor 112 includes a comparative friction member 114 and a comparative cooling member 116. The comparative friction member 114 has substantially the same shape as a shape of the friction member 14. However, the comparative cooling member 116 has a different shape from a shape of the cooling member 16.

Specifically, the comparative friction member 114 includes a first friction surface 126 and a second friction surface 128. The comparative cooling member 116 includes a first cooling surface 154 and a second cooling surface 156. In a case where an outer diameter of the bicycle disc brake rotor 112 is 160 mm, a total surface area of the first and second cooling surfaces 154 and 156 is 7294 mm$^2$, and a total surface area of the first and second friction surfaces 126 and 128 is 10152 mm$^2$. In this case, the total surface area of the first and second cooling surfaces 154 and 156 is substantially equal to 71.8% of the total surface area of the first and second friction surfaces 126 and 128. Under the above calculation conditions (CC-1) to (CC-4), a simulated temperature of the friction member 14 is 248.3° C.

In this embodiment, the total surface area of the first and second cooling surfaces 54 and 56 is substantially equal to 166.3% of the total surface area of the first and second friction surfaces 26 and 28. However, a ratio the total surface area of the first and second cooling surfaces 54 and 56 to the total surface area of the first and second friction surfaces 26 and 28 is not limited to this embodiment. The total surface area of the first and second cooling surfaces 54 and 56 can be larger than 200% of the total surface area of the first and second friction surfaces 26 and 28. The ratio of the total surface area of the first and second cooling surfaces 54 and 56 to the total surface area of the first and second friction surfaces 26 and 28 can be changed by changing the outer diameter and/or the shape of the bicycle disc brake rotor 12.

For example, in a case where an outer diameter of the bicycle disc brake rotor 12 is 203 mm, the total surface area of the first and second cooling surfaces 54 and 56 is 40310 mm$^2$, and the total surface area of the first and second friction surfaces 26 and 28 is 11600 mm$^2$ In this case, the total surface area of the first and second cooling surfaces 54 and 56 is substantially equal to 347.5% of the total surface area of the first and second friction surfaces 26 and 28.

The bicycle disc brake rotor 12 includes the following features.

(1) The surface area of the at least one cooling surface 54 and/or 56 is equal to or larger than 110% of the surface area of the at least one friction surface 26 and/or 28. Accordingly, it is possible to improve cooling efficiency of the bicycle disc brake rotor 12.

(2) The surface area of the at least one cooling surface 54 and/or 56 is equal to or smaller than 200% of the surface area of the at least one friction surface 26 and/or 28. Accordingly, it is possible to further improve cooling efficiency of the bicycle disc brake rotor 12.

(3) The at least one cooling surface 54 and/or 56 is disposed not to overlap with the at least one friction surface 26 and/or 28 when viewed from the axial direction D1 parallel to the rotational center axis A1 of the bicycle disc brake rotor 12. Accordingly, it is possible to utilize a surrounding space of the at least one friction surface 26 and/or 28 for the at least one cooling surface 54 and/or 56 without interference between the at least one friction surface 26 and/or 28 and the at least one cooling surface 54 and/or 56.

(4) The at least one cooling surface 54 and/or 56 is provided radially inward of the at least one friction surface 26 and/or 28 with respect to the rotational center axis A1 of the bicycle disc brake rotor 12. Accordingly, it is possible to utilize a radially inner space of the at least one friction surface 26 and/or 28 for the at least one cooling surface 54 and/or 56.

(5) The cooling member 16 includes the second inner peripheral edge 60 provided radially inward of the first inner peripheral edge 58 with respect to the rotational center axis A1. Accordingly, it is possible to increase the surface area of the at least one cooling surface 54 and/or 56.

(6) The maximum distance MD11 which is radially defined between the first inner peripheral edge 58 and the second inner peripheral edge 60 is longer than the maximum distance MD21 which is radially defined between the first inner peripheral edge 58 and the outer peripheral edge 64. Similarly, the maximum distance MD12 which is radially defined between the first inner peripheral edge 58 and the second inner peripheral edge 60 is longer than the maximum distance MD22 which is radially defined between the first inner peripheral edge 59 and the outer peripheral edge 64. Accordingly, it is possible to further increase the surface area of the at least one cooling surface 54 and/or 56.

(7) The cooling member 16 includes the center opening 62 defined by the second inner peripheral edge 60. Accordingly, it is possible to increase the surface area of the at least one cooling surface 54 and/or 56 with avoiding interference between the cooling member 16 and the bicycle hub assembly B21.

(8) The cooling member 16 includes the at least one opening 66 provided radially outward of the center opening 62. Accordingly, it is possible to save weight of the bicycle disc brake rotor 12 with improving cooling efficiency of the bicycle disc brake rotor 12.

(9) The friction member 14 is made of the first material. The cooling member 16 is made of the second material different from the first material. Accordingly, it is possible to select the second material for improving cooling efficiency of the bicycle disc brake rotor 12 regardless of the first material of the friction member 14.

(10) The first material has the first thermal conductivity. The second material has the second thermal conductivity. The second thermal conductivity is larger than the first thermal conductivity. Accordingly, it is possible to improve cooling efficiency of the bicycle disc brake rotor 12 using the second material having the second thermal conductivity.

(11) The first material includes stainless steel. The second material includes aluminum. Accordingly, it is possible to improve cooling efficiency of the bicycle disc brake rotor 12 with maintaining wear resistance of the friction member 14.

(12) The surface area of the at least one cooling surface 54 and/or 56 is equal to or larger than 110% of the total surface area of the first and second friction surfaces 26 and 28. Accordingly, it is possible to easily increase the surface area of the at least one cooling surface 54 and/or 56.

(13) The total surface area of the first and second cooling surfaces 54 and 56 is equal to or larger than 110% of the total surface area of the first and second friction surfaces 26 and 28. Accordingly, it is possible to easily increase the surface area of the at least one cooling surface using the first cooling surface 54 and the second cooling surface 56.

(14) The radially outer part 40 provided radially outward of the cooling body 38 and provided between the first friction part 30 and the second friction part 32 in the axial direction D1 parallel to the rotational center axis A1 of the bicycle disc brake rotor 12. Accordingly, it is possible to assure strength of the bicycle disc brake rotor 12 with improving cooling efficiency of the bicycle disc brake rotor 12.

(15) The first friction part 30 is attached to the radially outer part 40 of the cooling member 16. The second friction part 32 is attached to the radially outer part 40 of the cooling member 16. Accordingly, it is possible to improve strength of the bicycle disc brake rotor 12.

(16) The second overlapping region OR2 is larger than the first overlapping region OR1. Accordingly, it is possible to utilize a surrounding space of the hub attachment member 18 for the at least one cooling surface 54 and/or 56, increasing the surface area of the at least one cooling surface 54 and/or 56.

Second Embodiment

A bicycle disc brake rotor 212 in accordance with a second embodiment will be described below referring to FIGS. 19 to 21. The bicycle disc brake rotor 212 has the same structures as those of the bicycle disc brake rotor 12 except for a cooling material. Thus, elements having substantially the same function as those in the first embodiment will be numbered the same here, and will not be described and/or illustrated again in detail here for the sake of brevity.

Figure 19:
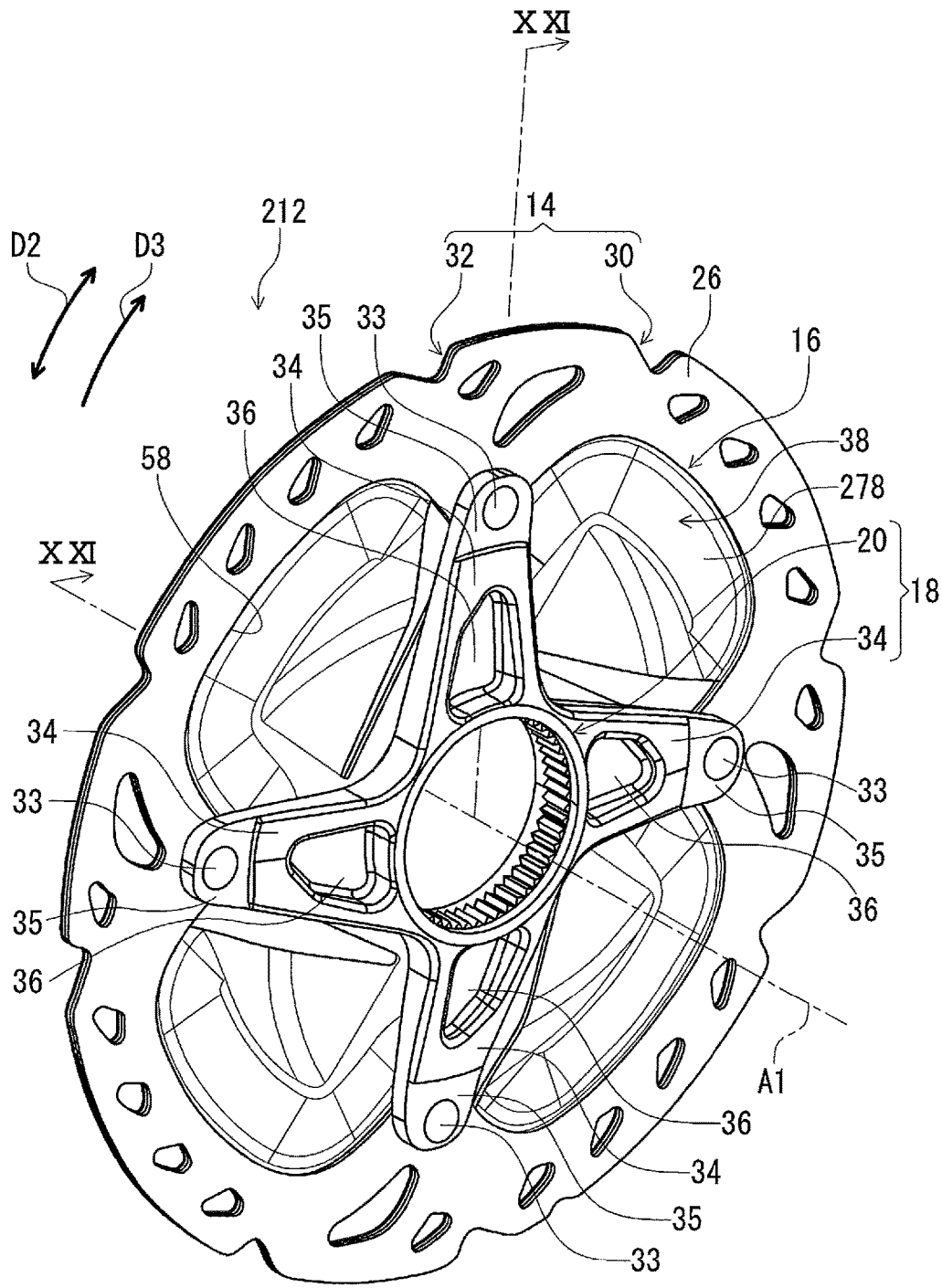
FIG. 19 is a perspective view of a bicycle disc brake rotor in accordance with a second embodiment.
Figure 20:
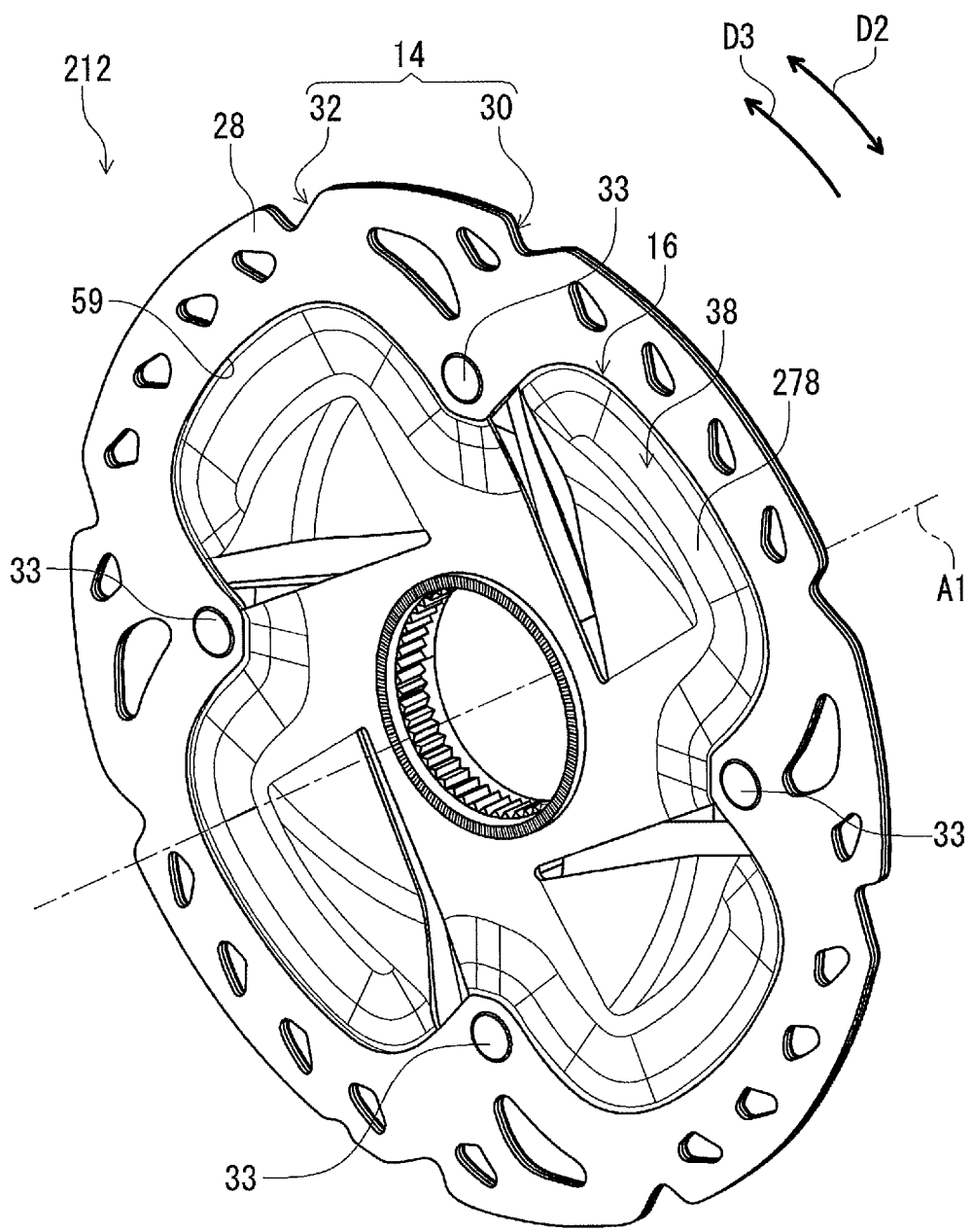
FIG. 20 is a perspective view of the bicycle disc brake rotor illustrated in FIG. 19.
Figure 21:
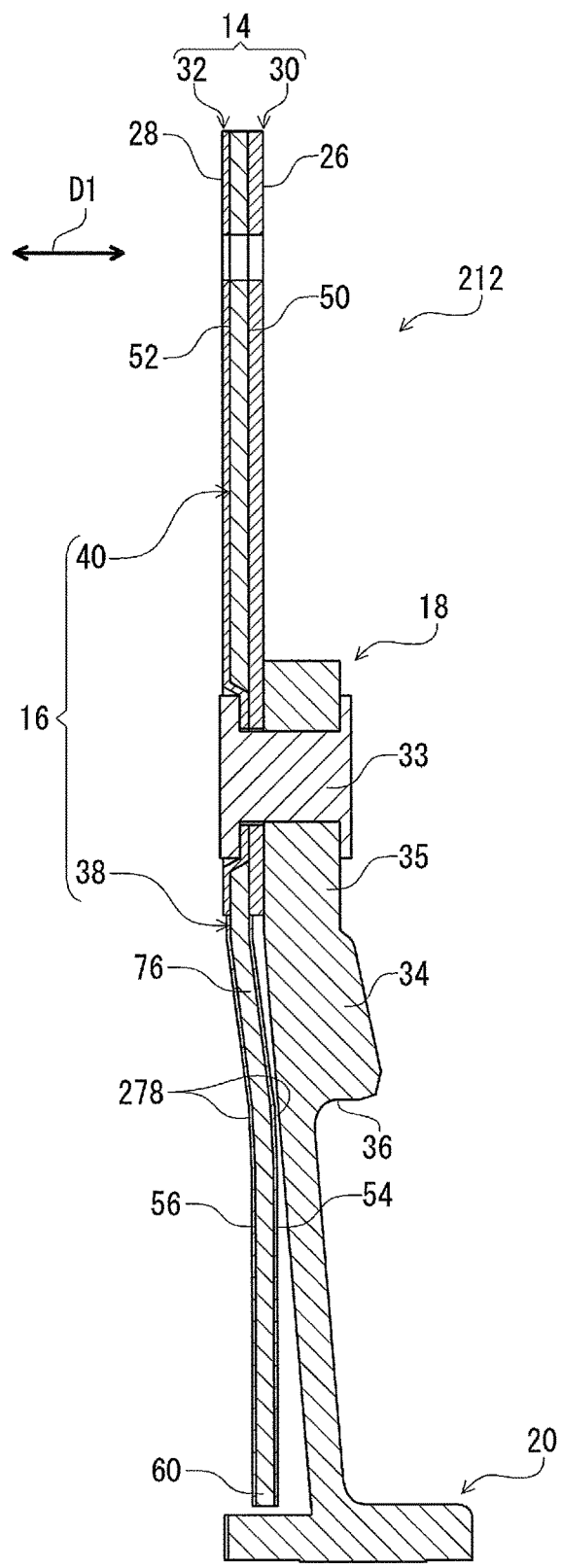
FIG. 21 is a partial cross-sectional view of the bicycle disc brake rotor taken along line XXI-XXI of FIG. 21.

As seen in FIGS. 19 to 21, the bicycle disc brake rotor 212 further comprises a cooling material 278 provided on the at least one cooling surface 54 and/or 56 of the cooling member 16. In this embodiment, the cooling material 278 is provided on the first cooling surface 54 and the second cooling surface 56. However, the cooling material 278 can be provided on at least one of the first cooling surface 54 and the second cooling surface 56.

The cooling material 278 covers the at least one cooling surface 54 and/or 56 of the cooling member 16. In this embodiment, the cooling material 278 entirely covers the first cooling surface 54 and the second cooling surface 56. However, the cooling material 278 can partly cover at least one of the first cooling surface 54 and the second cooling surface 56.

The cooling material 278 has a thermal emissivity larger than a thermal emissivity of a material of the cooling member 16. Examples of the cooling material 278 include a heat-resistant material and a metallic material. Examples of the heat-resistant material include a heat-resistant paint and a heat-resistant resin material. Examples of the metallic material include copper. In a case where the cooling material 278 includes the heat-resistant material, the cooling material 278 is applied to the first cooling surface 54 and the second cooling surface 56 by painting or coating. In a case where the cooling material 278 includes the metallic material, the cooling material 278 is applied to the first cooling surface 54 and the second cooling surface 56 by pasting, plating, and thermal spraying.

With the bicycle disc brake rotor 212, it is possible to obtain substantially the same effects as those of the bicycle disc brake rotor 12 in accordance with the first embodiment.

Furthermore, the bicycle disc brake rotor 212 includes the following features in addition to the features of the bicycle disc brake rotor 12.

(1) The cooling material is provided on the at least one cooling surface 54 and/or 56 of the cooling member 16. The cooling material has a thermal emissivity larger than a thermal emissivity of a material of the cooling member 16. Accordingly, the cooling material further improves cooling efficiency of the bicycle disc brake rotor 12.

(2) The cooling material covers the at least one cooling surface 54 and/or 56 of the cooling member 16. Accordingly, it is possible to further improve cooling efficiency of the bicycle disc brake rotor 12.

Third Embodiment

A bicycle disc brake rotor 312 in accordance with a third embodiment will be described below referring to FIG. 22. The bicycle disc brake rotor 312 has the same structures as those of the bicycle disc brake rotor 12 except for the cooling member. Thus, elements having substantially the same function as those in the first embodiment will be numbered the same here, and will not be described and/or illustrated again in detail here for the sake of brevity.

Figure 22:
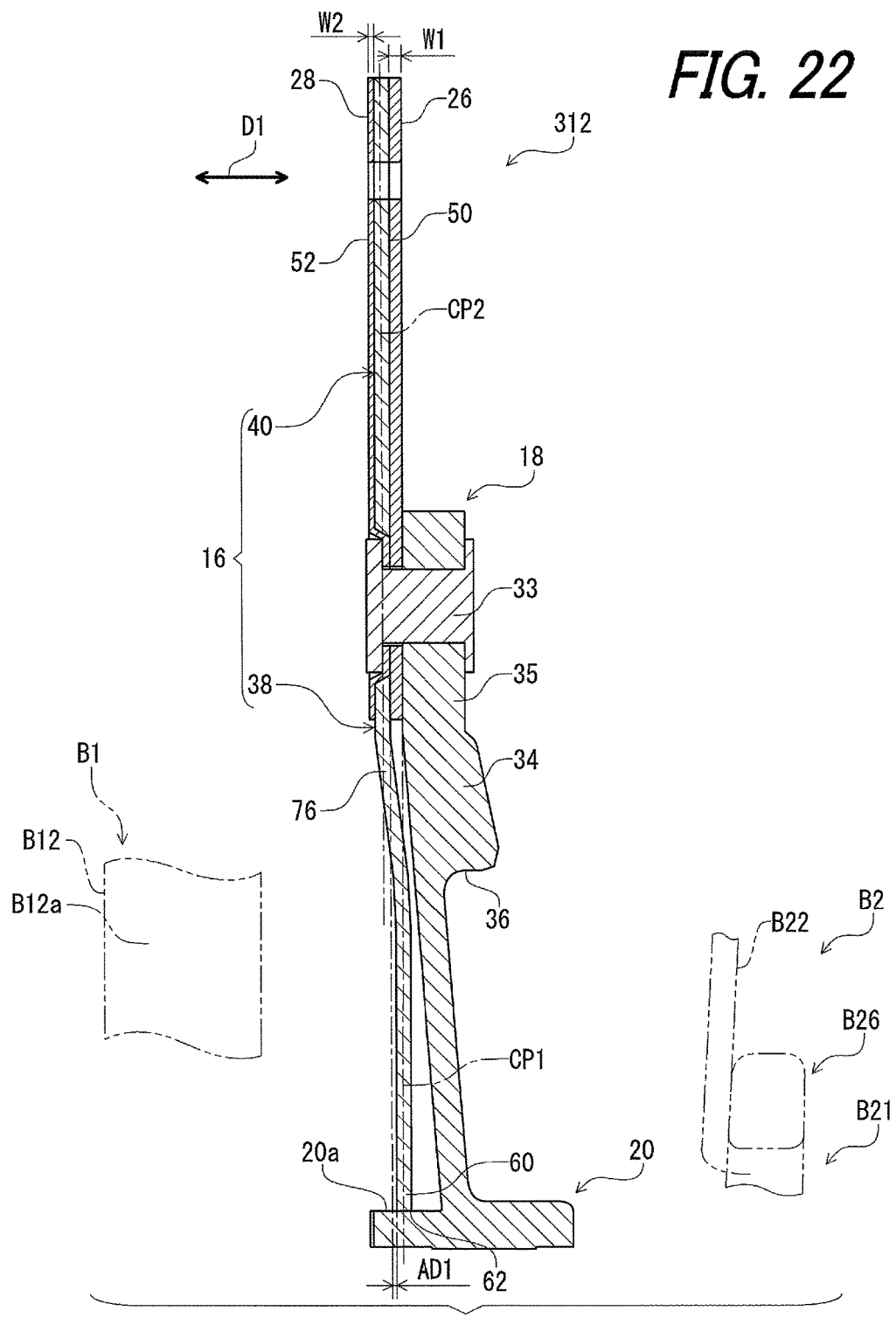
FIG. 22 is a partial cross-sectional view of a bicycle disc brake rotor in accordance with a third embodiment.

As seen in FIG. 22, in the bicycle disc brake rotor 312, the second inner peripheral edge 60 of the cooling member 16 is in contact with the hub attachment member 18. In this embodiment, the second inner peripheral edge 60 is in contact with an outer peripheral surface 20a of the hub engagement structure 20 of the hub attachment member 18.

With the bicycle disc brake rotor 212, it is possible to obtain substantially the same effects as those of the bicycle disc brake rotor 12 in accordance with the first embodiment.

Furthermore, since the second inner peripheral edge 60 of the cooling member 16 is in contact with the hub attachment member 18, it is possible to conduct heat from the cooling member 16 to the hub attachment member 18. This further improves cooling efficiency of the bicycle disc brake rotor 12.

Fourth Embodiment

A bicycle disc brake rotor 412 in accordance with a fourth embodiment will be described below referring to FIGS. 23 to 25. The bicycle disc brake rotor 412 has the same structures as those of the bicycle disc brake rotor 12 except for the cooling member. Thus, elements having substantially the same function as those in the above embodiments will be numbered the same here, and will not be described and/or illustrated again in detail here for the sake of brevity.

Figure 23:
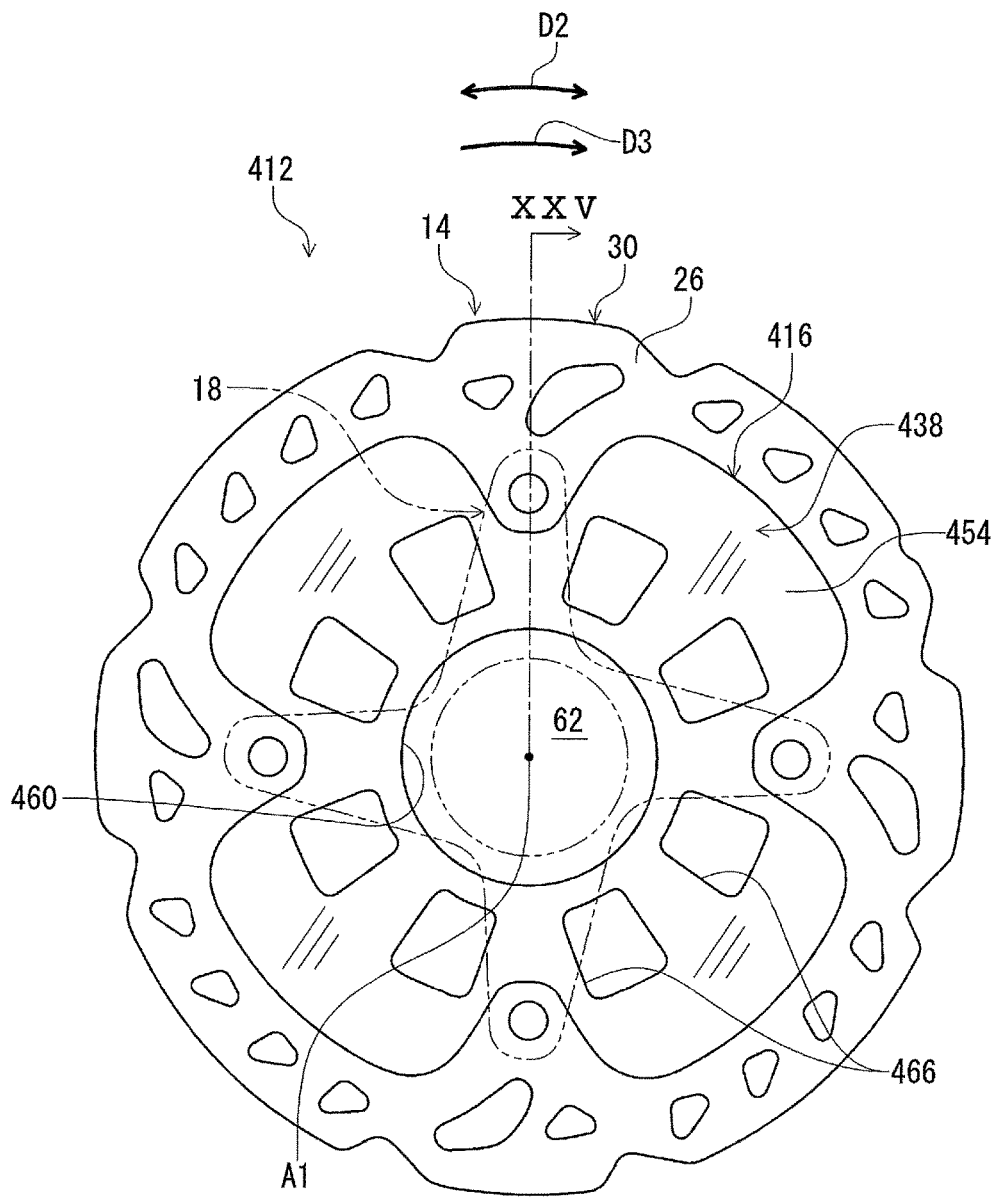
FIG. 23 is a perspective view of a bicycle disc brake rotor in accordance with a fourth embodiment.
Figure 24:
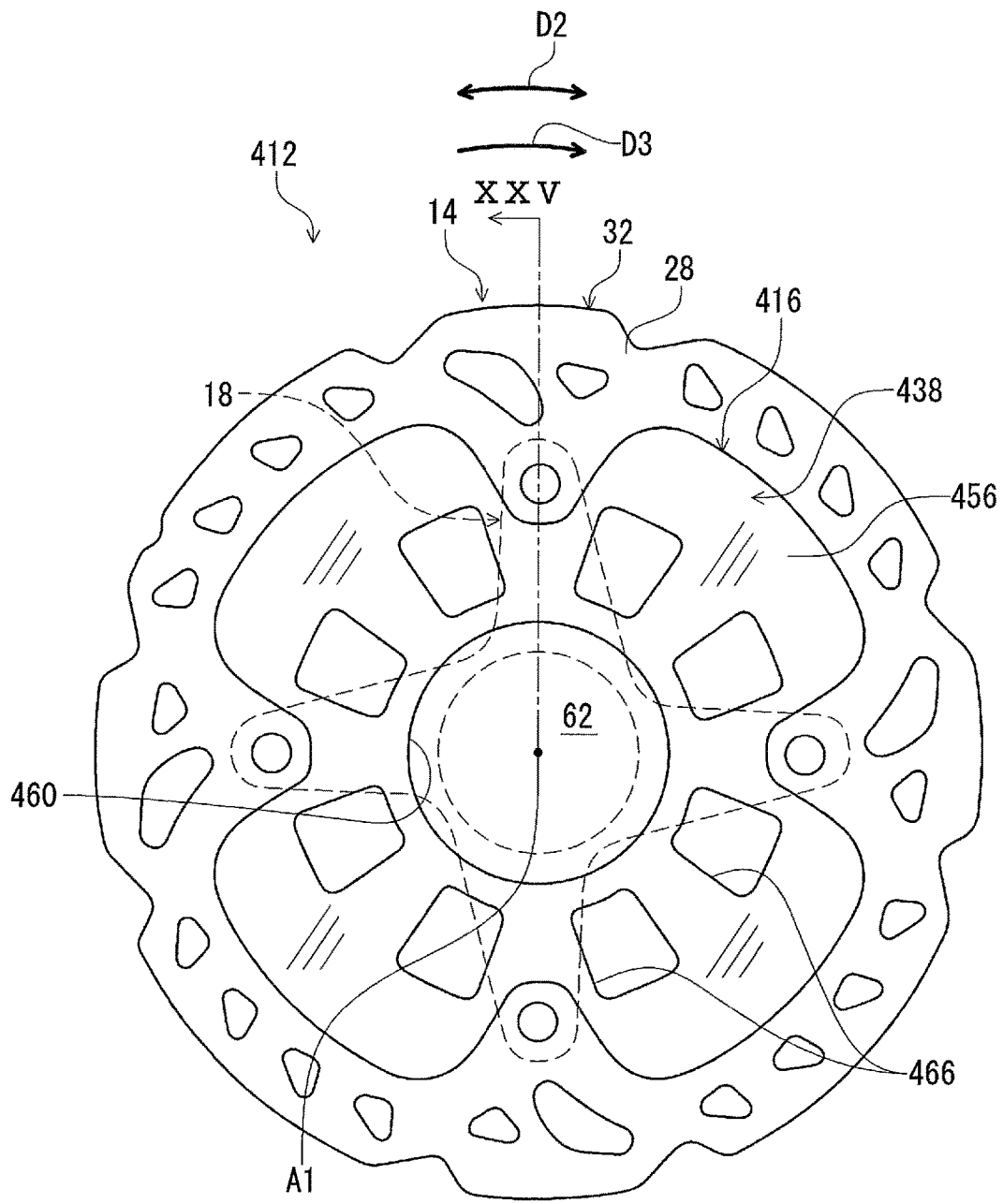
FIG. 24 is a perspective view of the bicycle disc brake rotor illustrated in FIG. 23.
Figure 25:
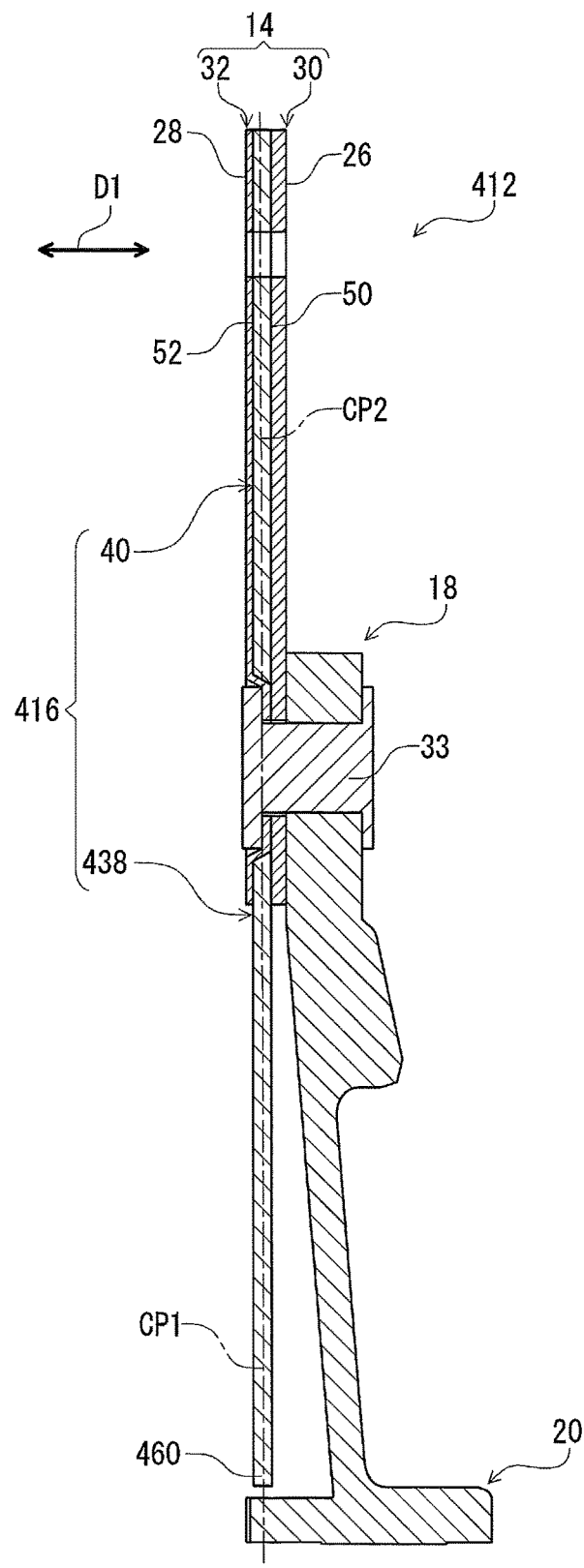
FIG. 25 is a partial cross-sectional view of the bicycle disc brake rotor taken along line XXV-XXV of FIG. 23.

As seen in FIGS. 23 to 25, the bicycle disc brake rotor 412 comprises a cooling member 416 coupled to the friction member 14. The cooling member 416 includes at least one cooling surface 454 and/or 456. Specifically, the cooling member 416 includes a cooling body 438 and the radially outer part 40.

The cooling member 416 has substantially the same structure as that of the cooling member 16 of the first embodiment. The cooling body 438 has substantially the same structure as that of the cooling body 38 of the first embodiment. Unlike the cooling member 16, however, the cooling member 416 does not include the air intakes 68. The cooling member 416 includes at least one opening 466 provided radially outward of the center opening 62. In this embodiment, the cooling member 416 includes openings 466 provided radially outward of the center opening 62. The openings 466 are arranged in the circumferential direction D2 at a constant pitch.

As seen in FIG. 25, the cooling member 416 includes an inner peripheral edge 460 defining the center opening 62. Unlike the second inner peripheral edge 460, however, the inner peripheral edge 460 is not offset from the radially outer part 40 of the cooling member 416 in the axial direction D1. An axial center plane CP41 of the inner peripheral edge 460 coincides with the axial center plane CP2 of the radially outer part 40 in the axial direction D1. The cooling member 416 has a linear cross section taken along the plane PL1 defined on the rotational center axis A1.

As seen in FIGS. 23 to 25, the cooling member 416 includes a first cooling surface 454 and a second cooling surface 456. In this embodiment, The surface area of the at least one cooling surface 454 and/or 456 is equal to or larger than 110% of a total surface area of the first and second friction surfaces 26 and 28.

A surface area of the at least one cooling surface 454 and/or 456 is equal to or larger than 110% of a surface area of the at least one friction surface 26 and/or 28. In this embodiment, the surface area of the at least one cooling surface 454 and/or 456 is equal to or larger than 110% of a total surface area of the first and second friction surfaces 26 and 28. Specifically, a total surface area of the first and second cooling surfaces 454 and 456 is equal to or larger than 110% of the total surface area of the first and second friction surfaces 26 and 28.

In this embodiment, the surface area of the at least one cooling surface 454 and/or 456 is equal to or smaller than 200% of the surface area of the at least one friction surface 26 and/or 28. The surface area of the at least one cooling surface 454 and/or 456 is equal to or smaller than 200% of the total surface area of the first and second friction surfaces 26 and 28. The total surface area of the first and second cooling surfaces 454 and 456 is equal to or smaller than 200% of the total surface area of the first and second friction surfaces 26 and 28.

For example, in a case where an outer diameter of the bicycle disc brake rotor 412 is 140 mm, the total surface area of the first and second cooling surfaces 454 and 456 is 10589 mm$^2$, and the total surface area of the first and second friction surfaces 26 and 28 is 8644 mm$^2$. In this case, the total surface area of the first and second cooling surfaces 454 and 456 is substantially equal to 122.5% of the total surface area of the first and second friction surfaces 26 and 28. Under the above calculation conditions (CC-1) to (CC-4), a simulated temperature of the bicycle disc brake rotor 412 is 356.4° C.

In this embodiment, the total surface area of the first and second cooling surfaces 454 and 456 is substantially equal to 122.5% of the total surface area of the first and second friction surfaces 26 and 28. However, a ratio the total surface area of the first and second cooling surfaces 454 and 456 to the total surface area of the first and second friction surfaces 26 and 28 is not limited to this embodiment. The total surface area of the first and second cooling surfaces 454 and 456 can be larger than 200% of the total surface area of the first and second friction surfaces 26 and 28. The ratio of the total surface area of the first and second cooling surfaces 454 and 456 to the total surface area of the first and second friction surfaces 26 and 28 can be changed by changing the outer diameter and/or the shape of the bicycle disc brake rotor 412.

With the bicycle disc brake rotor 412, it is possible to obtain substantially the same effects as those of the bicycle disc brake rotor 12 in accordance with the first embodiment.

Fifth Embodiment

A bicycle disc brake rotor 512 in accordance with a fifth embodiment will be described below referring to FIGS. 26 to 28. The bicycle disc brake rotor 512 has the same structures as those of the bicycle disc brake rotor 412 except for the cooling member. Thus, elements having substantially the same function as those in the above embodiments will be numbered the same here, and will not be described and/or illustrated again in detail here for the sake of brevity.

Figure 26:
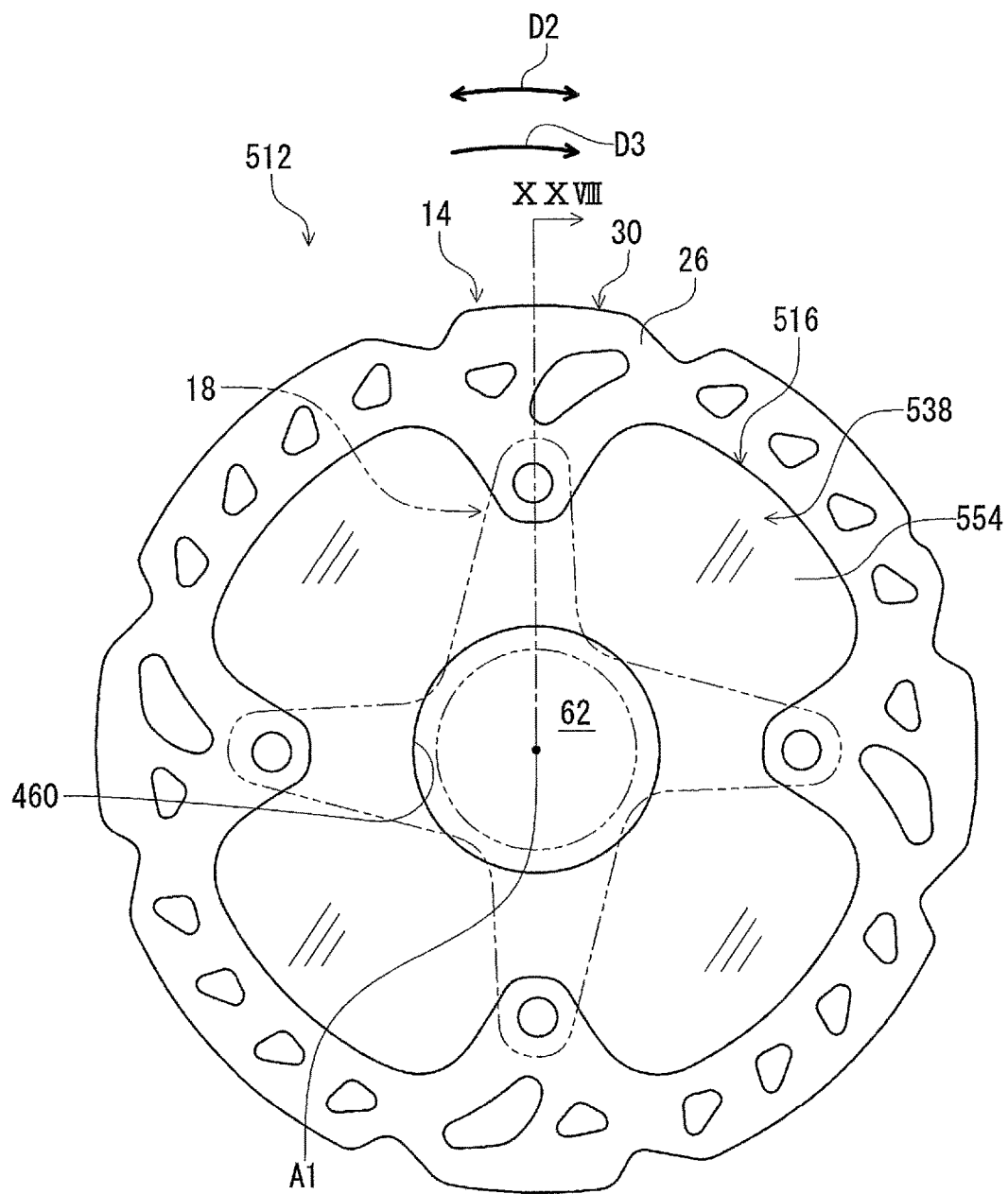
FIG. 26 is a perspective view of a bicycle disc brake rotor in accordance with a fifth embodiment.
Figure 27:
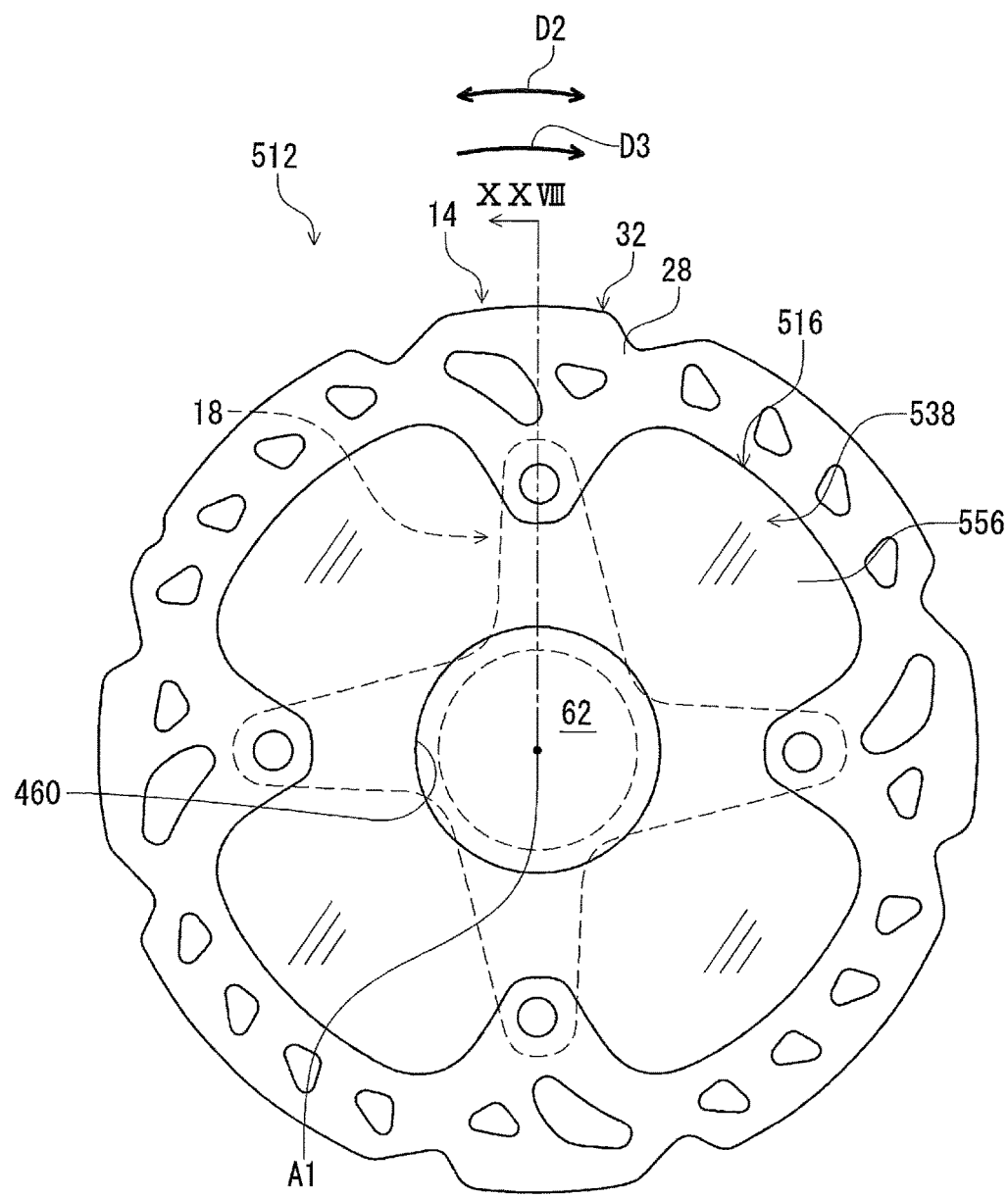
FIG. 27 is a perspective view of the bicycle disc brake rotor illustrated in FIG. 26.
Figure 28:
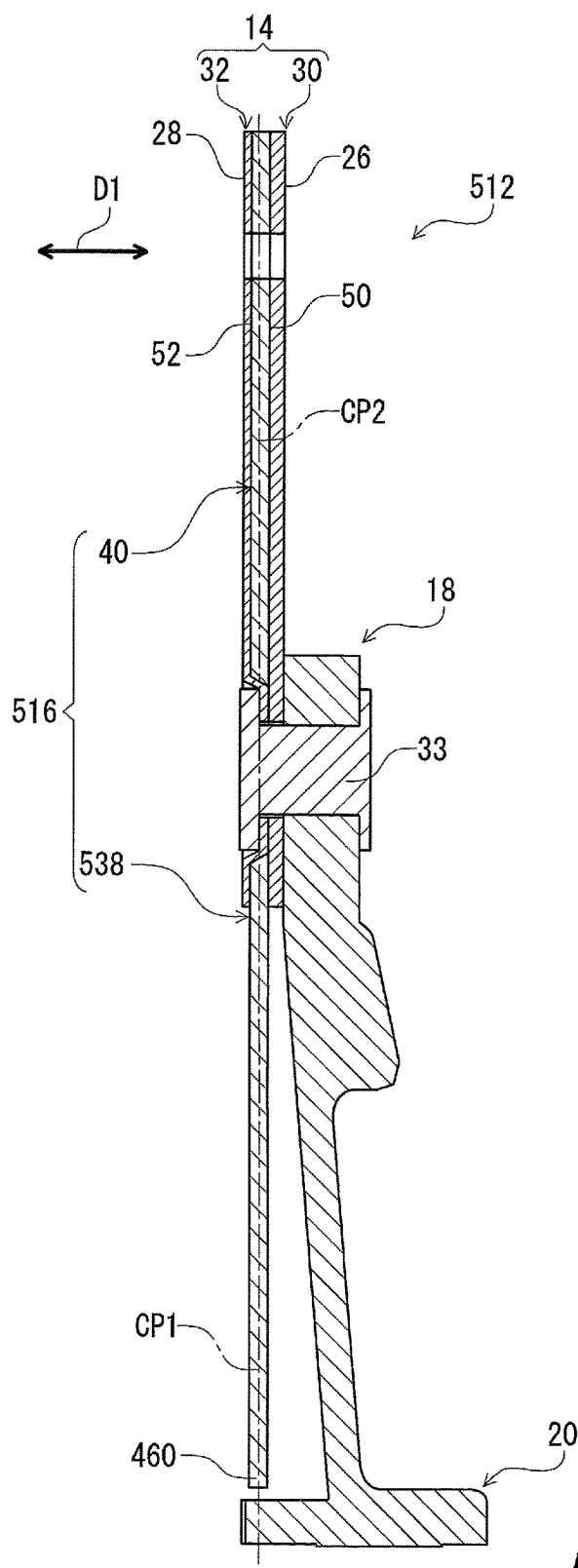
FIG. 28 is a partial cross-sectional view of the bicycle disc brake rotor taken along line XXVIII-XXVIII of FIG. 26.

As seen in FIGS. 26 to 28, the bicycle disc brake rotor 512 comprises a cooling member 516 coupled to the friction member 14. The cooling member 516 includes at least one cooling surface 554 and/or 556. Specifically, the cooling member 516 includes a cooling body 538 and the radially outer part 40.

The cooling member 516 has substantially the same structure as that of the cooling member 416 of the fourth embodiment. The cooling body 538 has substantially the same structure as that of the cooling body 438 of the fourth embodiment. Unlike the cooling member 416, however, the cooling member 516 does not include the openings 466.

The cooling member 516 includes a first cooling surface 554 and a second cooling surface 556. The first cooling surface 554 is provided as the at least one cooling surface. The second cooling surface 556 is provided as the at least one cooling surface. The second cooling surface 556 is opposite to the first cooling surface 554 in the axial direction D1.

A surface area of the at least one cooling surface 554 and/or 556 is equal to or larger than 110% of a surface area of the at least one friction surface 26 and/or 28. In this embodiment, the surface area of the at least one cooling surface 554 and/or 556 is equal to or larger than 110% of a total surface area of the first and second friction surfaces 26 and 28. Specifically, a total surface area of the first and second cooling surfaces 554 and 556 is equal to or larger than 110% of the total surface area of the first and second friction surfaces 26 and 28.

In this embodiment, the surface area of the at least one cooling surface 554 and/or 556 is equal to or smaller than 200% of the surface area of the at least one friction surface 26 and/or 28. The surface area of the at least one cooling surface 554 and/or 556 is equal to or smaller than 200% of the total surface area of the first and second friction surfaces 26 and 28. The total surface area of the first and second cooling surfaces 554 and 556 is equal to or smaller than 200% of the total surface area of the first and second friction surfaces 26 and 28.

For example, in a case where an outer diameter of the bicycle disc brake rotor 512 is 140 mm, the total surface area of the first and second cooling surfaces 554 and 556 is 13813 mm$^2$, and the total surface area of the first and second friction surfaces 26 and 28 is 8644 mm$^2$. In this case, the total surface area of the first and second cooling surfaces 554 and 556 is substantially equal to 159.8% of the total surface area of the first and second friction surfaces 26 and 28. Under the above calculation conditions (CC-1) to (CC-4), a simulated temperature of the bicycle disc brake rotor 512 is 336.0° C.

In this embodiment, the total surface area of the first and second cooling surfaces 554 and 556 is substantially equal to 159.8% of the total surface area of the first and second friction surfaces 26 and 28. However, a ratio the total surface area of the first and second cooling surfaces 554 and 556 to the total surface area of the first and second friction surfaces 26 and 28 is not limited to this embodiment. The total surface area of the first and second cooling surfaces 554 and 556 can be larger than 200% of the total surface area of the first and second friction surfaces 26 and 28. The ratio of the total surface area of the first and second cooling surfaces 554 and 556 to the total surface area of the first and second friction surfaces 26 and 28 can be changed by changing the outer diameter and/or the shape of the bicycle disc brake rotor 512.

It will be apparent to those skilled in the bicycle field from the present disclosure that the above embodiments can be at least partly combined with each other. For example, in the fourth and fifth embodiments, the second inner peripheral edge 460 can be offset from the radially outer part 40 as well as the second inner peripheral edge 60 of the first embodiment. In the first embodiment, the air intakes 68 can be omitted as well as the fourth or fifth embodiment. The cooling material 278 of the second embodiment can be applied to the cooling member 416 of the fourth embodiment or the cooling member 516 of the fifth embodiment. Furthermore, the second inner peripheral edge 460 of the fourth or fifth embodiment can be in contact with the hub engagement structure 20 of the hub attachment member 18 as well as the third embodiment.

The term "comprising" and its derivatives, as used herein, are intended to be open ended thin's that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle disc brake rotor comprising:
   a friction member including at least one friction surface;
   a cooling member coupled to the friction member, the cooling member including at least one cooling surface, a total surface area of the at least one cooling surface being equal to or larger than 110% of a total surface area of the at least one friction surface; and
   a hub attachment member coupled to the friction member, the hub attachment member including a hub engagement structure to engage with a bicycle hub assembly, wherein
   the cooling member includes a planar portion that extends in a radial direction of the bicycle disc brake rotor,
   the cooling member includes a protruding portion that protrudes from the planar portion in an axial direction of the bicycle disc brake rotor,
   the protruding portion is an inclined part that is sloped with respect to the radial direction when viewed in a cross section taken along a plane extending parallel to both the radial direction and the axial direction,
   the cooling member includes an innermost peripheral edge and an outer most peripheral edge, the inclined part being provided such that the innermost peripheral edge is axially offset from the outermost peripheral edge in the axial direction of the bicycle disc brake rotor,
   the friction member is made of a first material, and
   the cooling member is made of a second material different from the first material.

2. The bicycle disc brake rotor according to claim 1, wherein
   the total surface area of the at least one cooling surface is equal to or smaller than 200% of the total surface area of the at least one friction surface.

3. The bicycle disc brake rotor according to claim 1, wherein
   the at least one cooling surface is disposed not to overlap with the at least one friction surface when viewed from an axial direction parallel to a rotational center axis of the bicycle disc brake rotor.

4. The bicycle disc brake rotor according to claim 1, wherein
the at least one cooling surface is provided radially inward of the at least one friction surface with respect to a rotational center axis of the bicycle disc brake rotor.

5. A bicycle disc brake rotor comprising:
a friction member including at least one friction surface;
a cooling member coupled to the friction member, the cooling member including at least one cooling surface, a total surface area of the at least one cooling surface being equal to or larger than 110% of a total surface area of the at least one friction surface; and
a hub attachment member coupled to the friction member, the hub attachment member including a hub engagement structure to engage with a bicycle hub assembly, wherein
the cooling member includes a planar portion that extends in a radial direction of the bicycle disc brake rotor,
the cooling member includes a protruding portion that protrudes from the planar portion in an axial direction of the bicycle disc brake rotor,
the protruding portion is an inclined part that is sloped with respect to the radial direction when viewed in a cross section taken along a plane extending parallel to both the radial direction and the axial direction,
the cooling member includes an innermost peripheral edge and an outer most peripheral edge, the inclined part being provided such that the innermost peripheral edge is axially offset from the outermost peripheral edge in the axial direction of the bicycle disc brake rotor,
the friction member includes a first inner peripheral edge, and
the cooling member includes a second inner peripheral edge provided radially inward of the first inner peripheral edge with respect to the rotational center axis.

6. The bicycle disc brake rotor according to claim 5, wherein
the friction member includes an outer peripheral edge, and
a maximum distance which is radially defined between the first inner peripheral edge and the second inner peripheral edge is longer than a maximum distance which is radially defined between the first inner peripheral edge and the outer peripheral edge.

7. The bicycle disc brake rotor according to claim 5, wherein
the cooling member includes a center opening defined by the second inner peripheral edge.

8. The bicycle disc brake rotor according to claim 7, wherein
the cooling member includes at least one opening provided radially outward of the center opening.

9. The bicycle disc brake rotor according to claim 1, wherein
the first material has a first thermal conductivity,
the second material has a second thermal conductivity, and
the second thermal conductivity is larger than the first thermal conductivity.

10. The bicycle disc brake rotor according to claim 1, wherein
the first material includes stainless steel, and
the second material includes aluminum.

11. The bicycle disc brake rotor according to claim 1, wherein
the friction member includes
a first friction surface provided as the at least one friction surface, and
a second friction surface provided as the at least one friction surface, the second friction surface being opposite to the first friction surface in an axial direction parallel to a rotational center axis of the bicycle disc brake rotor, and
the total surface area of the at least one cooling surface is equal to or larger than 110% of a total surface area of the first and second friction surfaces.

12. The bicycle disc brake rotor according to claim 11, wherein
the cooling member includes
a first cooling surface provided as the at least one cooling surface, and
a second cooling surface provided as the at least one cooling surface, the second cooling surface being opposite to the first cooling surface in the axial direction, and
a total surface area of the first and second cooling surfaces is equal to or larger than 110% of the total surface area of the first and second friction surfaces.

13. The bicycle disc brake rotor according to claim 1, wherein
the friction member includes a first friction part and a second friction part, and
the cooling member includes
a cooling body including the at least one cooling surface, and
a radially outer part provided radially outward of the cooling body and provided between the first friction part and the second friction part in an axial direction parallel to a rotational center axis of the bicycle disc brake rotor.

14. The bicycle disc brake rotor according to claim 13, wherein
the first friction part is attached to the radially outer part of the cooling member, and
the second friction part is attached to the radially outer part of the cooling member.

15. The bicycle disc brake rotor according to claim 1, wherein
the hub attachment member overlaps with the friction member to define a first overlapping region when viewed from an axial direction parallel to a rotational center axis of the bicycle disc brake rotor,
the hub attachment member overlaps with the at least one cooling surface to define a second overlapping region when viewed from the axial direction, and
the second overlapping region is larger than the first overlapping region.

16. The bicycle disc brake rotor according to claim 1, further comprising:
a cooling material provided on the at least one cooling surface of the cooling member, wherein
the cooling material has a thermal emissivity larger than a thermal emissivity of a material of the cooling member.

17. The bicycle disc brake rotor according to claim 16, wherein
the cooling material covers the at least one cooling surface of the cooling member.

18. The bicycle disc brake rotor according to claim 5, wherein
the second inner peripheral edge of the cooling member is in contact with the hub attachment member.

19. A bicycle disc brake comprising:
a friction member including at least one friction surface;
a cooling member coupled to the friction member, the cooling member including at least one cooling surface, a total surface area of the at least one cooling surface being equal to or larger than 110% of a total surface area of the at least one friction surface; and
a hub attachment member coupled to the friction member, the hub attachment member including a hub engagement structure to engage with a bicycle hub assembly, wherein
the cooling member includes at least one opening facing toward a downstream side of a rotational direction with respect to a rotational center axis of the bicycle disc brake,
the cooling member having an inclined part that is sloped with respect to a radial direction of the bicycle disc brake when viewed in a cross section taken along a plane extending parallel to both the radial direction and an axial direction of the bicycle disc brake, and
the cooling member includes an innermost peripheral edge and an outer most peripheral edge, the inclined part being provided such that the innermost peripheral edge is axially offset from the outermost peripheral edge in an axial direction of the bicycle disc brake.

20. The bicycle disc brake rotor according to claim 1, wherein
the cooling member includes at least one opening provided on the at least one cooling surface.

21. The bicycle disc brake according to claim 19, wherein
the cooling member includes a planar portion that extends in a radial direction of the bicycle disc brake rotor, and
the inclined part protrudes from the planar portion in an axial direction of the bicycle disc brake.

22. A bicycle disc brake rotor comprising:
a friction member including at least one friction surface;
a cooling member coupled to the friction member, the cooling member including at least one cooling surface, a total surface area of the at least one cooling surface being equal to or larger than 110% of a total surface area of the at least one friction surface; and
a hub attachment member coupled to the friction member, the hub attachment member including a hub engagement structure to engage with a bicycle hub assembly, wherein
the cooling member includes a planar portion that extends in a radial direction of the bicycle disc brake rotor,
the cooling member includes a protruding portion that protrudes from the planar portion in an axial direction of the bicycle disc brake rotor,
the protruding portion is an inclined part that is inclined with respect to the radial direction when viewed in a cross section taken along a plane extending parallel to both the radial direction and the axial direction,
the cooling member includes an innermost peripheral edge and an outer most peripheral edge, the inclined part being provided such that the innermost peripheral edge is axially offset from the outermost peripheral edge in the axial direction of the bicycle disc brake rotor, and
the protruding portion is a curved part when viewed in the cross section taken along the plane extending parallel to the radial direction and the axial direction.

23. The bicycle disc brake rotor according to claim 22, wherein
the curved part is located radially inward of the planar portion.

* * * * *